United States Patent
Deguchi et al.

(10) Patent No.: US 7,164,344 B2
(45) Date of Patent: Jan. 16, 2007

(54) NON-CONTACT IC CARD READING/WRITING APPARATUS

(75) Inventors: Futoshi Deguchi, Fukuoka (JP); Hiroshi Yoshinaga, Kasuya-gun (JP); Akihiko Hirata, Fukuoka (JP); Masahiko Tanaka, Maebaru (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 228 days.

(21) Appl. No.: 10/743,899

(22) Filed: Dec. 24, 2003

(65) Prior Publication Data
US 2004/0134985 A1 Jul. 15, 2004

(30) Foreign Application Priority Data
Dec. 24, 2002 (JP) .......................... P2002-372222
Dec. 25, 2002 (JP) .......................... P2002-374383

(51) Int. Cl.
*G05B 19/00* (2006.01)
(52) U.S. Cl. ............... 340/10.51; 340/10.1; 340/10.52; 340/825.69; 340/825.72; 340/10.34; 340/5.1; 340/5.2; 340/538.16; 340/538.14; 340/505
(58) Field of Classification Search ........... 340/5.51, 340/10.1, 10.52, 825.69, 10.34, 5.1, 5.2, 340/538.16, 538.14, 505; 342/98
See application file for complete search history.

(56) References Cited

U.S. PATENT DOCUMENTS

| 5,317,330 A | * | 5/1994 | Everett et al. | 343/867 |
| 6,097,189 A | * | 8/2000 | Arndt et al. | 324/326 |
| 6,194,993 B1 | * | 2/2001 | Hayashi et al. | 340/10.34 |
| 6,590,498 B1 | * | 7/2003 | Helms | 340/572.7 |
| 2002/0044058 A1 | * | 4/2002 | Heinrich et al. | 340/572.1 |

FOREIGN PATENT DOCUMENTS

JP          2002007976          1/2002

* cited by examiner

*Primary Examiner*—Brian Zimmerman
*Assistant Examiner*—Vernal Brown
(74) *Attorney, Agent, or Firm*—Stevens, Davis, Miller & Mosher, LLP

(57) ABSTRACT

A non-contact IC card reading/writing apparatus having a superior reception characteristic includes a loop antenna, a resonant circuit unit, a wireless transmitting unit, and a wireless receiving unit. The resonant circuit unit, the wireless transmitting unit, and the wireless receiving unit are coupled to each other via any one of a directional coupler, a circulator, and an isolator.

4 Claims, 13 Drawing Sheets

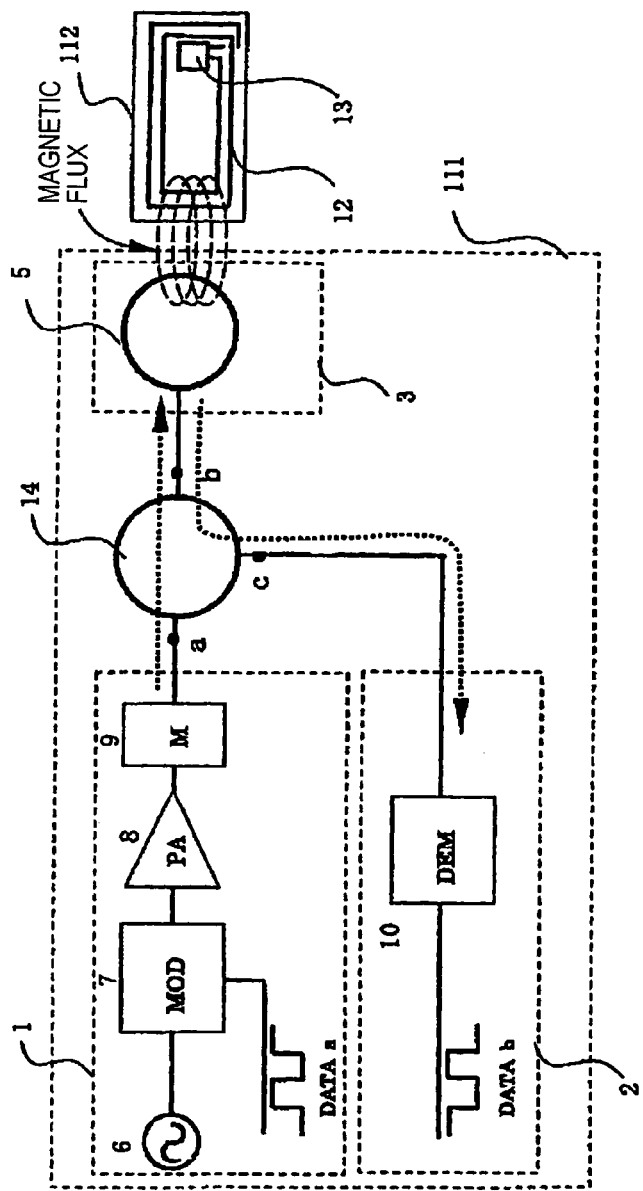
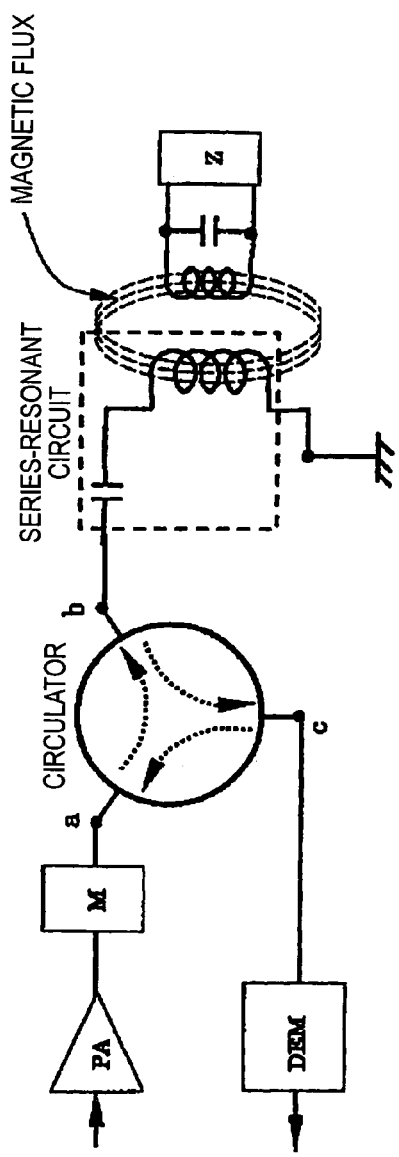
FIG. 2 (a)
FIG. 2 (b)

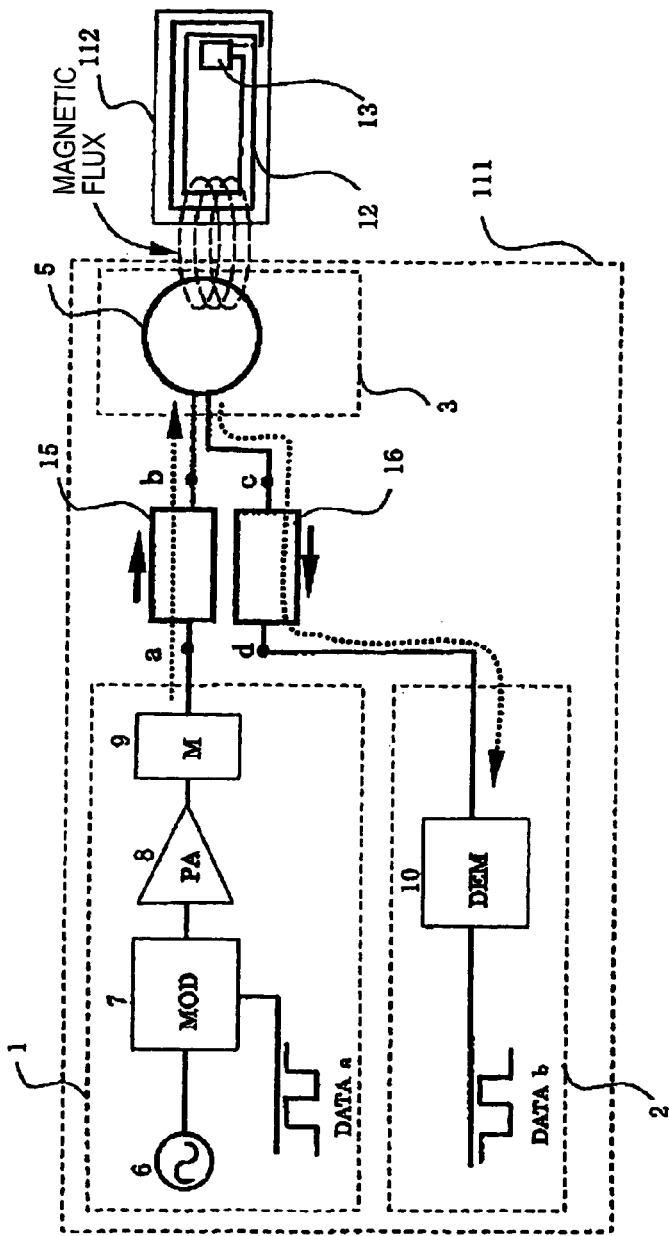
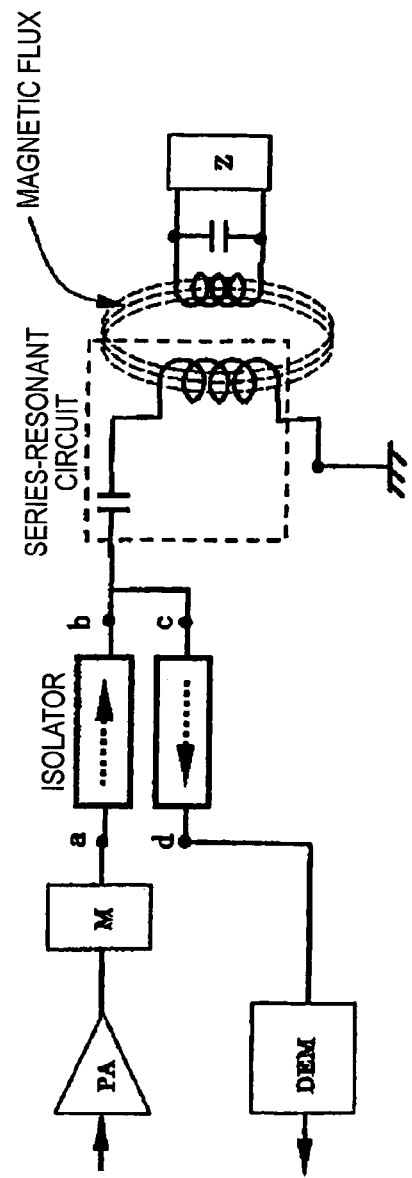
FIG. 3 (a)
FIG. 3 (b)

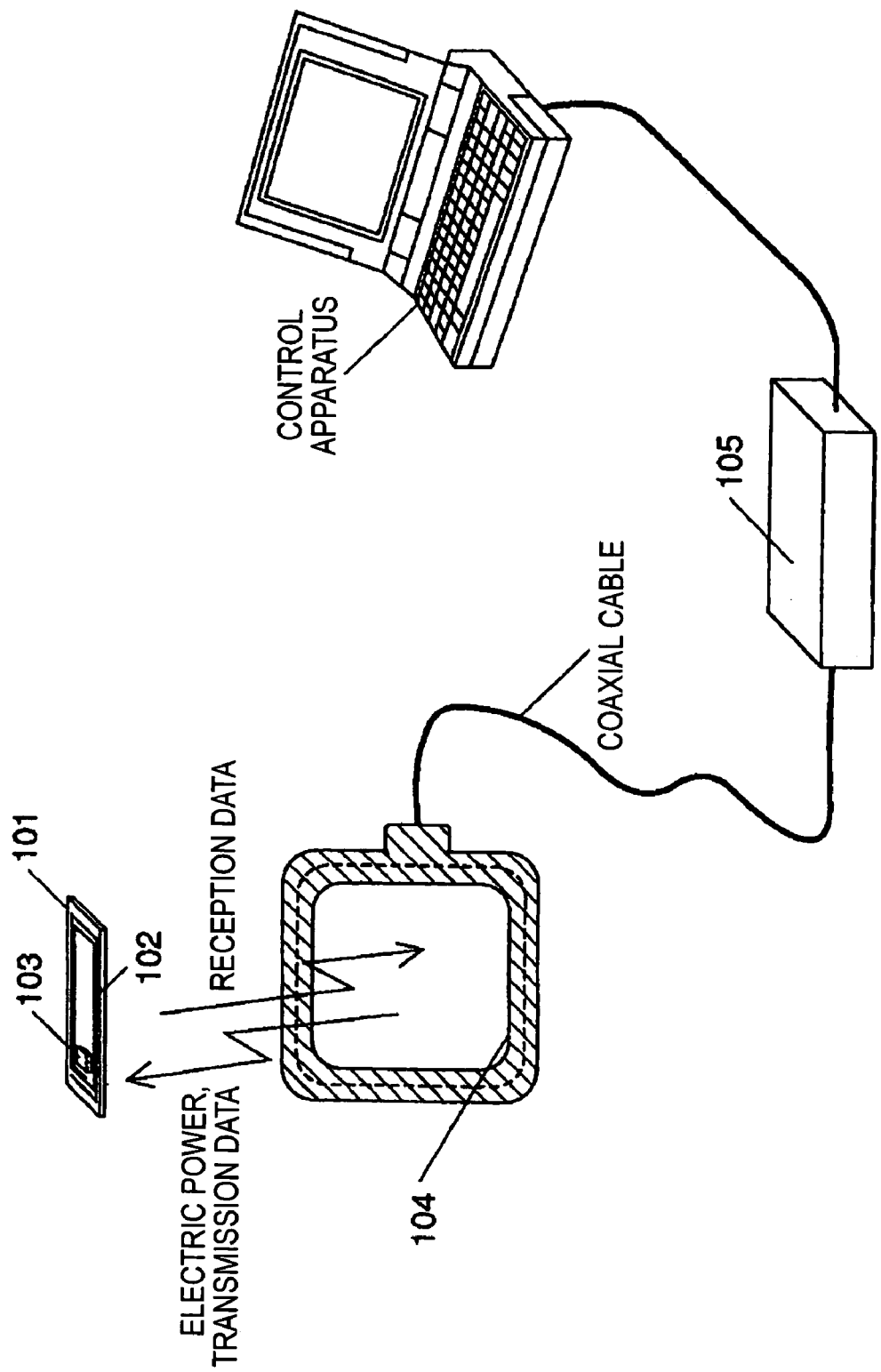

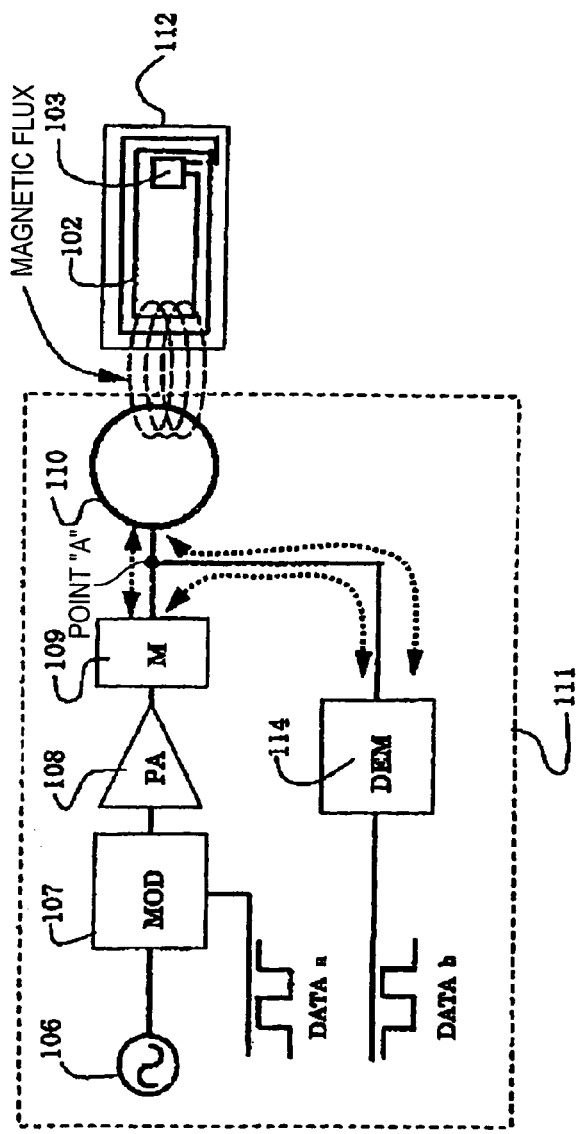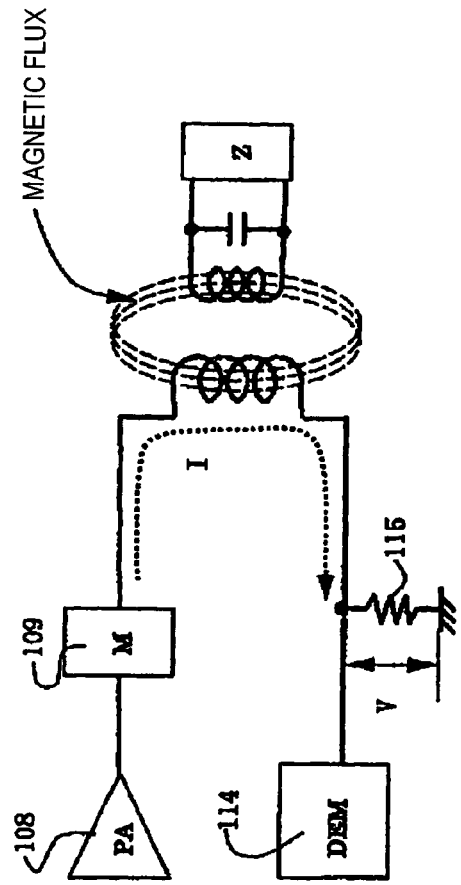
FIG. 5(a)
FIG. 5(b)

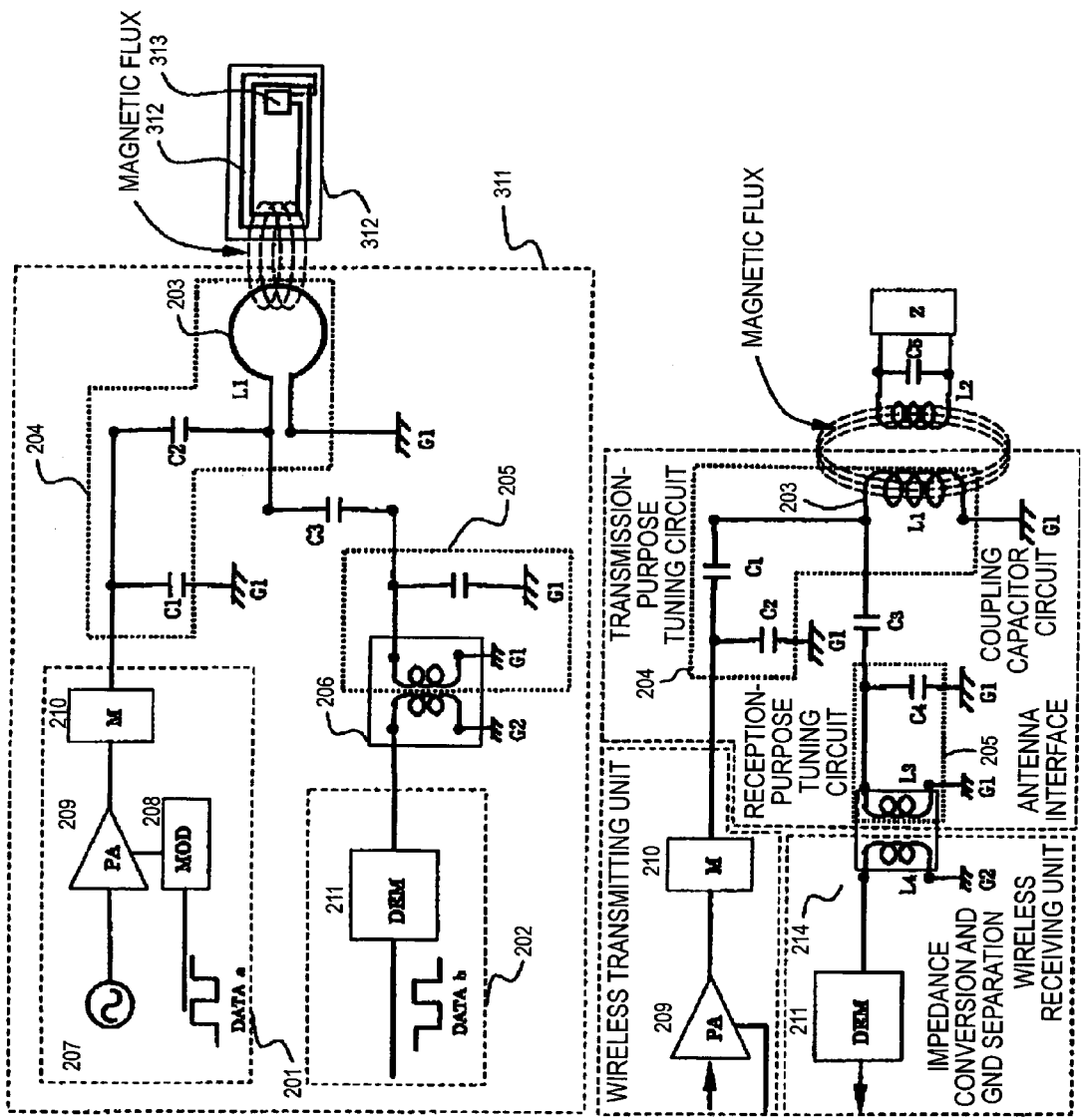

*FIG. 9*
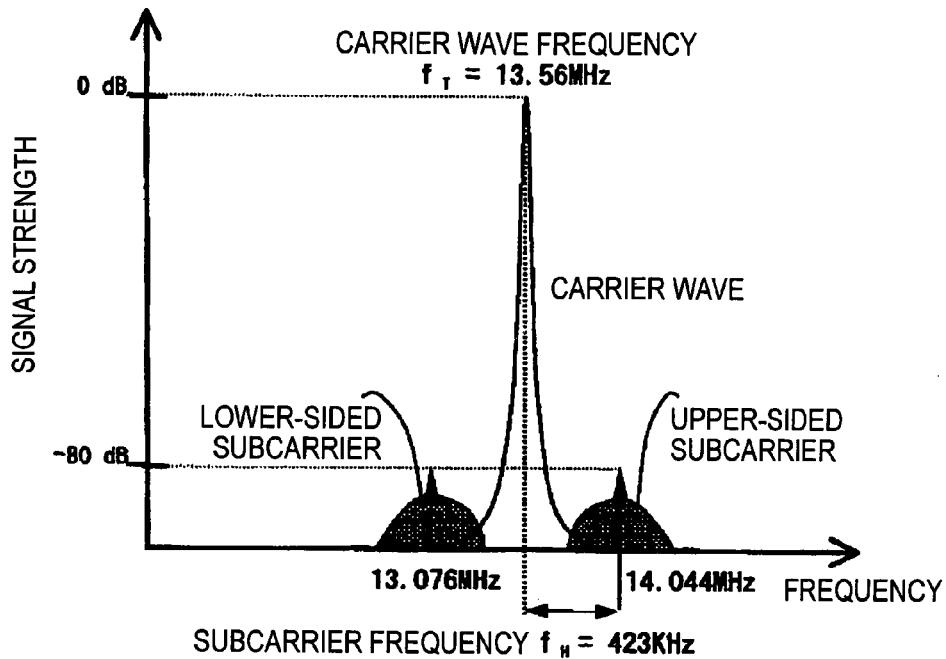
*FIG. 10*
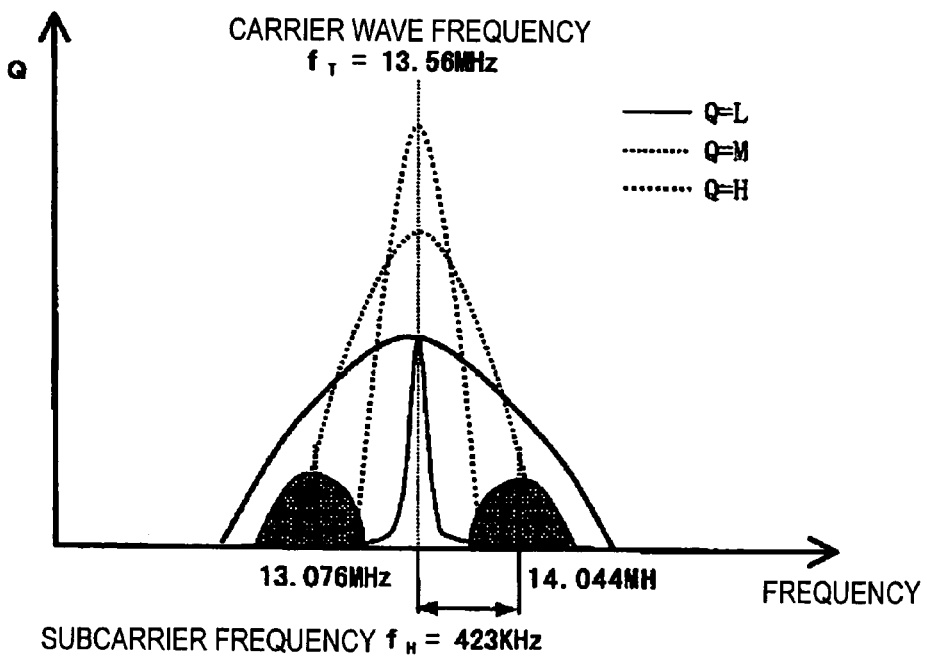
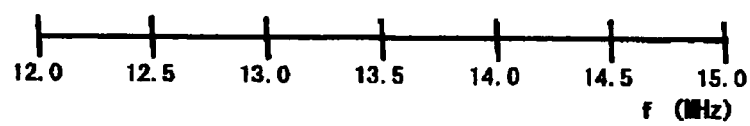

FIG. 15

| SYSTEM | BAND RATE | SUBCARRIER | $F_{TX}$ | RECOGNIZABLE RANGE |
|---|---|---|---|---|
| ISO 14443 | 106 KBd | 847 KHz | 13.56 MHz | 0 ~ 10 cm |
| ISO 15693 SHORT | 26.48 KBd | 423 KHz | 13.56 MHz | 0 ~ 30 cm |
| ISO 15693 LONG | 6.62 KBd | 423 KHz | 13.56 MHz | 0 ~ 70 cm |
| LONG RANGE SYSTEM | 9.0 KBd | 212 KHz | 13.56 MHz | 0 ~ 1 m |

# NON-CONTACT IC CARD READING/WRITING APPARATUS

BACKGROUND OF THE INVENTION

1. Field of the Invention

The present invention is related to a reading/writing apparatus used in a non-contact IC card system. More specifically, the present invention is directed to a non-contact IC card reading/writing apparatus capable of improving a power transfer efficiency to a non-contact IC card, and of improving a data reception efficiency from a non-contact IC card.

2. Description of the Related Art

In general, reading/writing systems with employment of IC cards are conventionally referred to as non-contact IC card systems. These conventional non-contact IC card systems have been gradually and practically utilized in physical distribution systems, traffic systems, air cargo management systems, and the like, which use a frequency band of, for example, 13.56 MHz.

Now, FIG. 4 is an explanatory diagram for explaining a conceptional idea of a conventional non-contact IC card system. As indicated in FIG. 4, this conventional non-contact IC card system is arranged by a non-contact IC card 101 (will be simply referred to as "IC card" hereinafter), and a reading/writing apparatus 105 which is communicated with this IC card. The non-contact IC card 101 is equipped with both an IC chip 103 and an antenna coil 102 on one sheet of such a card made of resin. This reading/writing apparatus 105 is equipped with a loop antenna 104. Both electric power and transmission data are continuously, or intermittently transmitted by this loop antenna 104, and reception data transmitted from an IC card is acquired by the loop antenna 104, which is located within such a range that this electric power and the transmission data can be received by this IC card.

As one example, the reading/writing apparatus of the non-contact IC card system described in (Japanese Laid-open Patent Application No. 2002-007976) is shown in FIG. 5. FIG. 5 is a block diagram of the conventional IC card reading/writing apparatus. FIG. 5 indicates a portion related to coupling between a reading/writing apparatus 111 and a non-contact IC card 112 of the above-described conventional non-contact IC card system.

Firstly, in the case that transmission data is transferred, a carrier wave produced from an oscillator 106 is entered to a modulator 107, and the modulator 107 modulates this entered carrier wave by data "DATAa." Then, the modulated carrier wave is amplified by a power amplifier 108, and the amplified carrier wave is transmitted via a matching circuit 109 from a loop antenna 110.

Also, in the case that only electric power is transferred, the carrier wave produced from the oscillator 106 is transmitted in a non-modulated carrier mode. The transmission of the non-modulated carrier wave from this reading/writing apparatus 111 to the non-contact IC card 112 is carried out by that magnetic fluxes produced from the loop antenna 110 magnetically intersect the antenna coil 102 of the non-contact IC card 112 so as to energize an induced voltage due to an electromagnetic coupling effect. On the side of the non-contact IC card 112, the induced voltage of the antenna coil 102 is rectified by a rectifying circuit (not shown) employed in the IC chip 103, and thus, the rectified voltage is employed as a power supply with respect to the respective circuits employed in the non-contact IC card 112. Also, the same induced voltage is conducted to a demodulating circuit (not shown) so as to demodulate data supplied from the reading/writing apparatus 111.

Next, when data is transferred from the non-contact IC card 112 to the reading/writing apparatus 111, the reading/writing apparatus 111 transmits non-modulated carrier waves so as to supply only electric power to the non-contact IC card 112. On the side of this non-contact IC card 112, in response to a "1" bit and a "0" bit of data "DATAb" read out from a memory (not shown) provided in the IC chip 103, a switch is turned ON/OFF in a modulating circuit (not shown) which is constituted by this switch and a load resistor (not shown), which are connected to, for example, the antenna coil 102. As explained above, when the switch is turned ON/OFF, a load with respect to the antenna coil 102 is varied. This load variation is transferred to the loop antenna 110 provided on the side of the reading/writing apparatus 111 due to electromagnetic induction effects, and thus, an impedance on the side of the loop antenna 110 is varied, so that a voltage/current value, namely an impedance at a point "A" of the reading/writing apparatus 111 is changed in response to the transmission data "DATAb" of the non-contact IC card 112. As a result, an amplitude of a high frequency signal is varied. In other words, this high frequency signal is amplitude-modulated by the data of the non-contact IC card 112. This modulated high frequency signal is demodulated by the demodulating circuit 114, so that the data "DATAb" is obtained.

First prior art is shown in FIG. 5(b). FIG. 5(b) is a diagram for indicating a detailed input portion of the demodulating circuit 111 shown in FIG. 5(a). As previously explained, when the data is transmitted from the non-contact IC card 112, a load "z" of the antenna coil 102 of the non-contact IC card 112 is changed based upon the data DATAb. As a result, an output current "I" of the power amplifier 108 is changed. Thus, in order to detect this current change, a resistor 115 is inserted into the ground side of the loop antenna 110, and a voltage drop which is produced by that the output current "I" flows through this resistor 115 is entered to the demodulating circuit 114. The demodulating circuit 114 detects a change contained in the inputted voltages so as to demodulate the data "DATAb" from the non-contact IC card 112. However, when the current "I" outputted from the power amplifier 108 flows through the resistor 115, the electric power is consumed in this resistor 115. As a result, the power amplifier 108 requires extra output power which is equivalent to such an electric power consumed by this resistor 115, so that a power transfer efficiency is lowered.

In this case, FIG. 6 is a block diagram of a conventional non-contact IC card reading/writing apparatus. As second prior art, FIG. 6(a) indicates a detailed peripheral portion of a demodulating circuit when parallel resonance is employed, in which a capacitor 116 and the loop antenna 110 are operated under parallel resonant condition.

In this case, since an impedance of a parallel-resonant circuit becomes a large impedance value in the vicinity of a resonant point, an output-sided impedance of a matching circuit 109 becomes a large impedance value in conjunction with the above-described large impedance value. Then, a voltage "V" of this high impedance point is captured via the resistor 117 to the demodulating circuit 114 so as to be demodulated. In this circuit arrangement, a series impedance which is constituted by the resistor 117 and the input impedance of the demodulating circuit 114 in the carrier wave band is connected parallel to such a parallel circuit which is constituted by the loop antenna 110 and the capacitor 116. Therefore, in order to detect the data transmitted from the non-contact IC card 112, a Q-factor of the resonant circuit is lowered. This phenomenon may immediately lower a power transfer efficiency with respect to the non-contact IC card 112.

Also, FIG. 6(*b*) is a circuit diagram of a peripheral circuit portion of the demodulating circuit 114 as third prior art in the case that a power transfer efficiency is improved by way of series resonance. In this third prior art, both the loop antenna 110 and the capacitor 118 constitute a series-resonant circuit. When series resonance occurs, since an impedance of this series-resonant circuit represents a small impedance value, a current "I" derived from the power amplifier 108 is supplied to the resistor 119, and thus, a voltage drop occurred in this resistor 119 is detected by the demodulating circuit 114. As a consequence, electric power is consumed in the resistor 119. Furthermore, in this case, since the resistor 119 is series-connected with respect to the series-resonant circuit, the Q-factor of the series-resonant circuit is lowered, so that the power transfer efficiency is lowered.

In addition, FIG. 6(*c*) indicates a circuit arrangement as to an input unit of the demodulating circuit 114 and a peripheral circuit thereof, as fourth prior art. In this fourth prior art, the power amplifier 108, a parallel-resonant circuit 121, and the demodulating circuit 114 are coupled to each other by employing a matching transformer 120 having windings "n1", "n2", and "n3." In this circuit, a turn ratio of the winding "n1" to the winding "n2" is set to such a value which is matched by a resonant frequency between the output of the power amplifier 108 and the parallel-resonant circuit 114. A coupling operation between the demodulating circuit 114 and the parallel-resonant circuit 121 is carried out by this matching transformer 120. Then, a turn ratio of the winding "n3" to the winding "n2" is arranged in such a manner that a matching condition may be established in the frequency band of the data "DATAb" transmitted from the non-contact IC card 112. However, in this circuit arrangement, an insertion loss of the matching transformer 120 occurs, so that the power transfer efficiency is lowered.

Moreover, in any circuits of the first prior art to the fourth prior art, there is no directivity as to transfer directions of the electric power, the transmission data, and the reception data. That is, in any circuit arrangements of these prior art, the output power derived from the power amplifier 108 may be supplied to any of the loop antenna 110 and the demodulating circuit 114. As a result, the electric power radiated from the loop antenna 110 to the spatial area is lost by such an electric power which is supplied to the demodulating circuit 110, so that the power transfer efficiency is lowered.

Also, in the case that the reception data is acquired, the change contained in the load impedance values at the loop antenna 110 may be transferred to both the demodulating circuit 114 and the power amplifier 108. As a result, the transferred changing component of the load impedance from the loop antenna 110 is lowered on the side of the demodulating circuit 114.

Furthermore, since the high frequency signal having the large amplitude derived from the power amplifier 108 is supplied to the demodulating circuit 114, there is another problem. That is, such a filter circuit having a high-performance band blocking characteristic must be provided at a prestage of the demodulating circuit 114 in order to filter this high frequency signal having the large amplitude.

SUMMARY OF THE INVENTION

The present invention has been made to solve the problems of the above-described prior art, and therefore, has an object to provide a non-contact IC card reading/writing apparatus having a superior reception characteristic.

A non-contact IC card reading/writing apparatus of the present invention is arranged by comprising: a loop antenna for supplying both electric power and a transmission signal to a non-contact IC card by way of an electromagnetic induction effect and for acquiring a reception signal from the non-contact IC card by way of a load variation; a resonant circuit unit for resonating the loop antenna at a desirable frequency; a wireless transmitting unit for supplying both electric power and transmission data via the resonant circuit unit to the loop antenna; and a wireless receiving unit for acquiring a reception signal from the loop antenna via the resonant circuit unit; and is arranged in such a manner that data transmitted from the non-contact IC card is demodulated from the reception signal by a demodulating circuit; in which the resonant circuit unit, the wireless transmitting unit, and the wireless receiving unit are coupled to each other via any one of a directional coupler, a circulator, and an isolator.

A non-contact IC card reading/writing apparatus of the present invention is arranged by comprising: a loop antenna for supplying both electric power and a transmission signal to a non-contact IC card by way of an electromagnetic induction effect and for acquiring a reception signal from the non-contact IC card by way of a load variation; a first resonant circuit unit for resonating the loop antenna at a first desirable frequency; a wireless transmitting unit for supplying both electric power and transmission data via the first resonant circuit unit to the loop antenna; and further, a wireless receiving unit for acquiring a reception signal from said loop antenna via a second resonant circuit unit which is connected to said loop antenna by way of a coupling capacitor and is resonated at a second desirable frequency; is arranged in such a manner that data transmitted from the non-contact IC card is demodulated from the reception signal by a demodulating circuit.

BRIEF DESCRIPTION OF THE DRAWINGS

FIG. 2 is a block diagram of a non-contact IC card reading/writing apparatus according to an embodiment 2 of the present invention.

FIG. 3 is a block diagram of a non-contact IC card reading/writing apparatus according to an embodiment 3 of the present invention.

FIG. 4 is an explanatory diagram for explaining the conceptional idea of the conventional non-contact IC card system.

FIG. 5 is a block diagram of the conventional non-contact IC card reading/writing apparatus.

FIG. 7 is a block diagram of a non-contact IC card reading/writing apparatus according to an embodiment of the present invention.

FIG. 9 is a graph for graphically showing a relationship between a frequency and a signal strength.

FIG. 10 is a graph for graphically indicating a relationship between a frequency of an antenna and a Q-factor.

FIG. 15 is a diagram for indicating a comparison table of 13.56 MHz system.

DESCRIPTION OF THE PREFFERED EMBODIMENTS

Figure 1A:
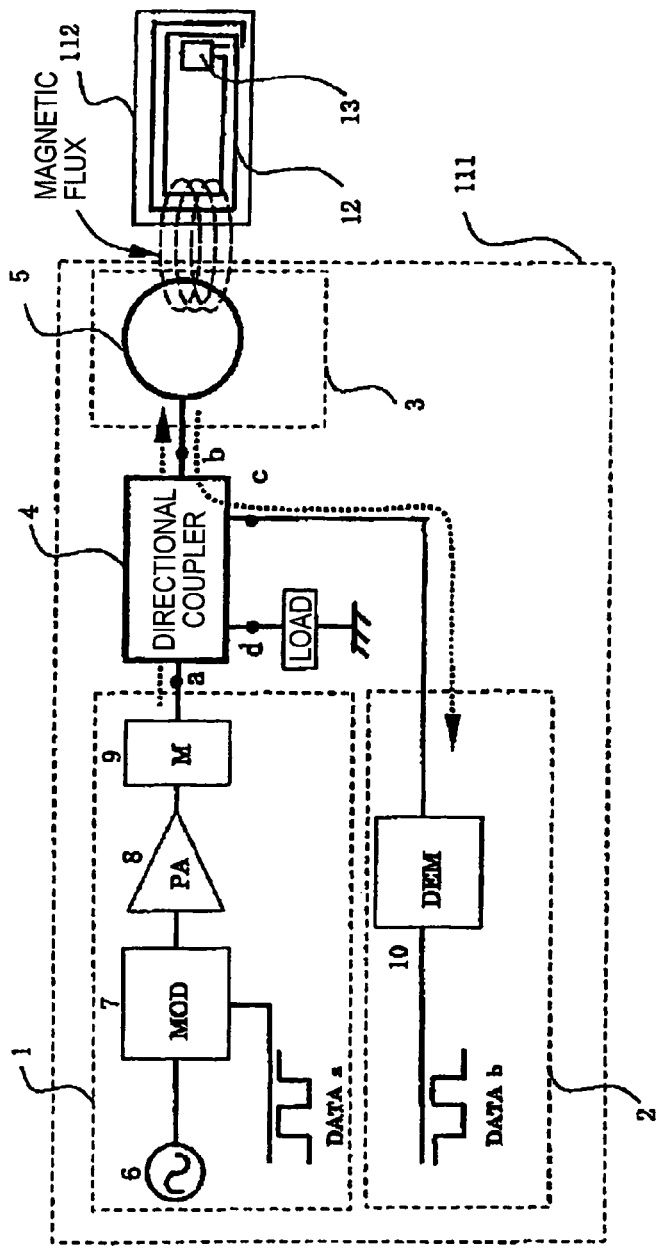
FIG. 1 is a block diagram of a non-contact IC card reading/writing apparatus according to an embodiment 1 of the present invention.

Referring now to FIG. 1 to FIG. 3 and FIG. 7 to FIG. 15, various embodiments of the present invention will be described. It should be understood that a definition of a non-contact IC card described in the present invention is not limited only to a so-called "card", but may be made as a wireless communication medium capable of being communicated with a reading/writing apparatus in a non-contact manner. As a consequence, these non-contact IC cards may contain IC tags, ID tags, and identification labels, depending upon use purposes.

Also, a reading/writing apparatus corresponds to an apparatus which is communicated with the above-described wireless communication media. Then, the reading/writing apparatus reads information from the wireless communication media, and writes information into the wireless communication media. It should be understood that the reading/writing apparatus performs at least any one of information reading/writing operations, depending upon use purposes.

A non-contact IC card reading/writing apparatus is featured by such a non-contact IC card reading/writing apparatus comprising: a loop antenna for supplying both electric power and a transmission signal to a non-contact IC card by way of an electromagnetic induction effect and for acquiring a reception signal from the non-contact IC card by way of a load variation; a resonant circuit unit for resonating the loop antenna at a desirable frequency; a wireless transmitting unit for supplying both electric power and transmission data via the resonant circuit unit to the loop antenna; and a wireless receiving unit for acquiring a reception signal from the loop antenna via the resonant circuit unit; and arranged in such a manner that data transmitted from the non-contact IC card is demodulated from the reception signal by a demodulating circuit; in which the resonant circuit unit, the wireless transmitting unit, and the wireless receiving unit are coupled to each other via a directional coupler.

Since the primary line path of the directional coupler is interposed between the wireless transmitting unit and the resonant circuit unit constructed of both the loop antenna and the capacitor, and also, the secondary line path of the directional coupler is interposed between the wireless receiving unit and the resonant circuit unit constructed of the loop antenna and the capacitor, the isolation can be established between the wireless transmitting unit and the wireless receiving unit, and also, the directivity can be established between the wireless receiving unit and the resonant circuit unit constructed of the loop antenna and the capacitor.

As a result, since the wireless transmitting unit is isolated from the wireless receiving unit, such an operation that the high frequency signal having the large amplitude is entered from the wireless transmitting unit into the demodulating circuit employed in the wireless receiving unit can be largely reduced. Therefore, such a filter circuit having the high-performance band blocking characteristic is no longer required. This filter circuit has been conventionally required so as to filter this high frequency having the large amplitude, and has been provided at the prestage of the demodulating circuit. Furthermore, lowering of the power efficiency which is caused by inserting the filter circuit can be avoided.

Furthermore, since the directivity is established between the wireless receiving unit and the resonant circuit unit constituted by the loop antenna and the capacitor, the high frequency signal flowing from the loop antenna to the wireless receiving circuit, namely, the high frequency signal (incident electromagnetic wave) which is transmitted from a wireless transmitting unit is reached via the primary line path of the directional coupler to the loop antenna. Then, this reached high frequency signal is reflected from the loop antenna as reflection waves in response to a change of antenna impedance values in a desirable frequency band, and is again entered into the directional coupler as such a high frequency signal (reflection wave), the wave propagation direction of which is opposite to that of the above-described high frequency signal. Then, this entered high frequency signal is outputted from one terminal of the secondary line path of the directional coupler, and then is conducted to the wireless receiving unit. As a result, the input signal to the wireless receiving unit may become only such a high frequency signal (reflection wave) in response to the change contained in the antenna impedance values in the desirable frequency band as explained above. Therefore, such an ideal circuit arrangement may be established, and thus, the reading/writing apparatus having the better reception characteristic can be provided.

Also, a non-contact IC reading/writing apparatus is arranged by that a resonant circuit unit, a wireless transmitting unit, and a wireless receiving unit are coupled to each other via a circulator.

Since the primary line path of the circulator is interposed between the wireless transmitting unit and the resonant circuit unit constructed of both the loop antenna and the capacitor, and also, the secondary line path of the circulator is interposed between the wireless receiving unit and the resonant circuit unit constructed of the loop antenna and the capacitor, the isolation can be established between the wireless transmitting unit and the wireless receiving unit, and also, the directivity can be established between the wireless receiving unit and the resonant circuit unit constructed of the loop antenna and the capacitor.

As a result, since the wireless transmitting unit is isolated from the wireless receiving unit, such an operation that the high frequency signal having the large amplitude is entered from the wireless transmitting unit into the demodulating circuit employed in the wireless receiving unit can be largely reduced. Therefore, such a filter circuit having the high-performance band blocking characteristic is no longer required. This filter circuit has been conventionally required so as to filter this high frequency having the large amplitude, and has been provided at the prestage of the demodulating circuit. Furthermore, lowering of the power efficiency which is caused by inserting the filter circuit can be avoided.

Furthermore, since the directivity is established between the wireless receiving unit and the resonant circuit unit constituted by the loop antenna and the capacitor, the high frequency signal flowing from the loop antenna to the wireless receiving circuit, namely, the high frequency signal (incident electromagnetic wave) which is transmitted from a wireless transmitting unit is reached via the primary line path of the circulator to the loop antenna. Then, this reached high frequency signal is reflected from the loop antenna as reflection waves in response to a change of antenna impedance values in a desirable frequency band, and is again entered into the circulator as such a high frequency signal (reflection wave), the wave propagation direction of which is opposite to that of the above-described high frequency signal. Then, this entered high frequency signal is outputted from one terminal of the secondary line path of the circulator, and then is conducted to the wireless receiving unit. As a result, the input signal to the wireless receiving unit may become only such a high frequency signal (reflection wave) in response to the change contained in the antenna impedance values in the desirable frequency band as explained above. Therefore, such an ideal circuit arrangement may be established, and thus, the reading/writing apparatus having the better reception characteristic can be provided.

Also, a non-contact IC reading/writing apparatus is arranged by that a resonant circuit unit, a wireless transmitting unit, and a wireless receiving unit are coupled to each other via an isolator.

Since a first isolator is interposed between the wireless transmitting unit and the resonant circuit unit constructed of both the loop antenna and the capacitor, and also, a second isolator is interposed between the wireless receiving unit and the resonant circuit unit constructed of the loop antenna and the capacitor, the isolation can be established between the wireless transmitting unit and the wireless receiving unit, and also, the directivity can be established between the wireless receiving unit and the resonant circuit unit constructed of the loop antenna and the capacitor.

As a result, since the wireless transmitting unit is isolated from the wireless receiving unit, such an operation that the high frequency signal having the large amplitude is entered from the wireless transmitting unit into the demodulating circuit employed in the wireless receiving unit can be largely reduced. Therefore, such a filter circuit having the high-performance band blocking characteristic is no longer required. This filter circuit has been conventionally required so as to filter this high frequency having the large amplitude, and has been provided at the prestage of the demodulating circuit. Furthermore, lowering of the power efficiency which is caused by inserting the filter circuit can be avoided.

Furthermore, since the directivity is established between the wireless receiving unit and the resonant circuit unit constituted by the loop antenna and the capacitor, the high frequency signal flowing from the loop antenna to the wireless receiving circuit, namely, a high frequency signal (incident electromagnetic wave) which is transmitted from a wireless transmitting unit is reached via the first isolator to the loop antenna. Then, this reached high frequency signal is reflected from the loop antenna as reflection waves in response to a change of antenna impedance values in a desirable frequency band, and is again entered into the second isolator as such a high frequency signal (reflection wave), the wave propagation direction of which is opposite to that of the above-described high frequency signal. Then, this entered high frequency signal is outputted from one terminal of the second isolator, and then is conducted to the wireless receiving unit. As a result, the input signal to the wireless receiving unit may become only such a high frequency signal (reflection wave) in response to the change contained in the antenna impedance values in the desirable frequency band as explained above. Therefore, such an ideal circuit arrangement may be established, and thus, the reading/writing apparatus having the better reception characteristic can be provided.

A reading/writing apparatus of a non-contact IC card system is featured by such a non-contact IC card reading/writing apparatus comprising: a loop antenna for supplying both electric power and a transmission signal to a non-contact IC card by way of an electromagnetic induction effect and for acquiring a reception signal from the non-contact IC card by way of a load variation; a first resonant circuit unit for resonating the loop antenna at a first desirable frequency; a wireless transmitting unit for supplying both electric power and transmission data via the first resonant circuit unit to the loop antenna; and further, a wireless receiving unit for acquiring a reception signal from said loop antenna via a second resonant circuit unit which is connected to said loop antenna by way of a coupling capacitor and is resonated at a second desirable frequency; and arranged in such a manner that data transmitted from the non-contact IC card is demodulated from the reception signal by a demodulating circuit. With employment of the above-described arrangement, both the resonant circuit exclusively used for the transmission frequency and the resonant circuit exclusively used for the reception frequency can be employed.

A reading/writing apparatus of a non-contact IC card system, is featured by that a resonant frequency of the first resonant circuit unit is set to a frequency of a carrier wave used to transfer both the electric power and the transmission signal; and a resonant frequency of the second resonant circuit unit is set to a frequency of a modulated subcarrier which is produced based upon a load variation occurred on the side of the non-contact IC card. Since this arrangement is employed, when the electric power and the transmission signal are transmitted from the reading/writing apparatus, since the resonant frequency of the first resonant circuit unit is set to such a frequency which is specified to the frequency of the carrier wave used to transfer both the electric power and the transmission signal, the Q-factor can be maximized, and thus, both the electric power and the transmission signal can be transferred in a higher efficiency.

Furthermore, when the data is received from the non-contact IC card, since the resonant frequency of the second resonant circuit unit is set to such a frequency which is specified to a reception modulation side band which has been modulated by the load variation, the Q-factor can be maximized, and detouring of the carrier waves to the reception side can be largely reduced. As a result, since the reception signal can be received in a higher efficiency, a reception efficiency can be improved.

A reading/writing apparatus of a non-contact IC card system is featured in that a second coil is provided in the vicinity of a first coil which constitutes the second resonant circuit unit and is coupled to the first coil by way of a mutual induction effect; one terminal of the first coil is connected to a first ground; one terminal of the second coil is connected to a second ground; and the ground of both the wireless transmission unit and an antenna circuit unit is separated from the ground of the wireless receiving unit. As a result, it is possible to avoid such an operation that the second ground on the reception side is swung by a carrier signal having a large amplitude transmitted from the wireless transmitting unit, and the reception performance can be largely improved.

A reading/writing apparatus of a non-contact IC card system is featured by that both a turn number "n1" of the first coil which constitutes the second resonant circuit unit and a turn number "n2" of the second coil which is coupled to the first coil by way of the mutual induction effect are selected in such a manner that the turn number "n1" is matched to an output impedance "Z1" of the second resonant circuit unit, and the turn number "n2" is matched to an input impedance of the wireless receiving unit; and both the first coil and the second coil own an impedance converting function. As a result, the mismatching loss can be reduced, and the reception performance can be improved.

A reading/writing apparatus of a non-contact IC card system is featured by that both a first capacitor "C1" and a second capacitor "C2" are series-connected between one terminal and the other terminal of the second coil; an output signal is derived from a joint point between the first capacitor C1 and the second capacitor C2; and both the first capacitor C1 and the second capacitor C2 own an impedance converting function. As a result, the circuit scale can be made compact and the reception efficiency can be improved.

A reading/writing apparatus of a non-contact IC card system is featured as follows: That is, in the circuit arrangement constituted by the first coil "L3" which constructs the second resonant circuit unit recited in claim 4 and the second coil "L4" which is mutually coupled to the first coil "L3" by way of mutual induction effects, the resonant frequency of the second resonant circuit unit is set to a frequency of a lower-sided modulated subcarrier within both side bands formed by a load variation on the side of the non-contact IC card. On the reception side, the carrier wave corresponds to an unwanted wave (U) whereas the modulated subcarrier corresponds to a wanted wave (D). Therefore, in order to increase a D/U ratio, apparently, the wanted wave (D) must be increased and the unwanted wave (U) must be decreased. Since the first coil L3 is coupled to the second coil L4 by way of the mutual induction effects, the higher the frequency becomes, the coupling degree between the first coil L3 and the second coil L4 is decreased, whereas the lower the frequency becomes, the coupling degree between the first coil L3 and the second coil L4 is increased. As a result, the coupling degree as to the unwanted wave (U) whose frequency is high becomes larger than the coupling degree as to the wanted wave (D) whose frequency is low. As a consequence, the D/U ratio can be improved and the reception performance can be improved.

A non-contact IC card reading/writing apparatus, is featured by that a first capacitor C6 and a second capacitor C7 are series-connected between one terminal and the other terminal of the second coil "L4" recited in claim 5, and an output signal is derived from an intermediate point between the first capacitor C6 and the second C7. In this circuit arrangement, the resonant frequency of the second resonant circuit unit is set to a frequency of an upper-sided modulated subcarrier within both side bands formed by a load variation on the side of the non-contact IC card. On the reception side, the carrier wave corresponds to an unwanted wave (U) whereas the modulated subcarrier corresponds to a wanted wave (D). Therefore, in order to increase a D/U ratio, apparently, the wanted wave (D) must be increased and the unwanted wave (U) must be decreased. Since the first resonant circuit which is resonated at the frequency of the carrier wave is coupled to the second resonant circuit which is resonated at the frequency of the upper-sided modulated subcarrier by employing a coupling capacitor C3, the coupling degree is large at the high frequency, whereas the coupling degree is small at the low frequency. As a result, the coupling degree as to the unwanted wave (U) whose frequency is high becomes larger than the coupling degree as to the wanted wave (D) whose frequency is low. As a consequence, the D/U ratio can be improved and the reception performance can be improved. Further, since the loop coil is impedance-matched with the wireless receiving unit, the impedance converting operation is not carried out at the secondary winding by the induction coupling, but since the tap down circuit by the capacitor of the resonant circuit is employed, the impedance can be converted while this D/U ratio is maintained.

A non-contact IC card reading/writing apparatus, is featured by that a first resonant circuit which is resonated at a frequency of a carrier wave is coupled to a second resonant circuit which is resonated at a frequency of a subcarrier by a coupling capacitor C3 so as to constitute a sub-tuning circuit. First, due to the characteristic of the coupling capacitor C3, the coupling degree is large at the high frequency, whereas the coupling degree is small at the low frequency. Conversely, as to the characteristic of the second coil L4, since the second coil L4 is magnetically coupled to the first coil L3 which constitutes the second resonant circuit unit byway of the mutual induction effects, the coupling degree is small when the frequency is high, whereas the coupling degree is large when the frequency is low. Therefore, in the case that the two circuits having these countersensed characteristics are combined with each other, the respective characteristics are canceled to each other, so that a broadband resonant circuit having a flat frequency characteristic can be obtained. As a result, irrespective of the frequency, even in the systems where the frequencies of the modulated subcarriers are different from each other, namely, 212 KHz, 484 KHz, and 847 KHz, the D/U ratio can be made constant by single hardware. The stable reception characteristic can be achieved, and also, the circuit scale can be made compact.

A non-contact IC card reading/writing apparatus, is featured by that while an intermediate frequency transformer is provided between the second resonant circuit unit and the wireless receiving unit, one terminal of a first coil "L5" of the intermediate transformer is connected the ground of the second resonant circuit unit, one terminal of a second coil "L6" of the intermediate transformer is connected to the ground of the wireless receiving unit, and the ground of the second resonant circuit unit is separated from the ground of the wireless receiving unit, and further, the carrier wave and the reception signal wave are separated from each other in a frequency manner by the intermediate frequency transformer. As a result, it is possible to avoid such an operation that the ground of the wireless receiving unit is swung by the carrier wave having the large amplitude supplied from the second resonant circuit unit. Furthermore, such an operation that the frequency component of the carrier wave is entered into the wireless receiving unit can be largely suppressed, and thus, the reception performance can be improved.

(Embodiment 1)

Figure 1B:
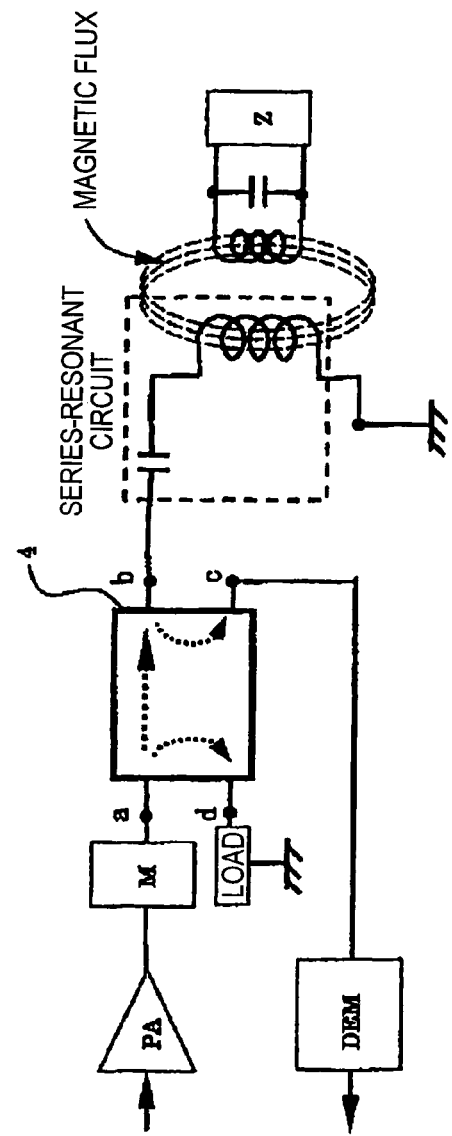

FIG. 1 is a block diagram for showing a non-contact IC card reading/writing apparatus according to an embodiment 1 of the present invention. FIG. 1(a) is a block diagram for indicating the non-contact IC card reading/writing apparatus according to the embodiment 1 of the present invention, and FIG. 1(b) is a detailed circuit diagram as to a portion of the non-contact IC card reading/writing apparatus of FIG. 1(a). That is, FIG. 1(b) is the detailed circuit diagram in such a case that a series-resonant circuit is employed as one example of a resonant circuit. FIG. 1(a) is a block diagram for indicating a circuit portion related to such a coupling operation that a reading/writing apparatus 111 is coupled to a non-contact IC card 112 in a non-contact IC card system. In FIG. 1, in the case that transmission data is transferred, a carrier wave produced from an oscillator 6 is entered to a modulator 7, and the modulator 7 modulates this entered carrier wave by data "DATAa." Then, the modulated carrier wave is amplified by a power amplifier 8, and the amplified carrier wave is transmitted via a matching circuit 9 and also via a primary line path formed between a terminal "a" and another terminal "b" of a directional coupler 4 shown in FIG. 1 from a loop antenna 5. Also, in the case that only electric power is transferred, the carrier wave produced from the oscillator 6 is transmitted in a non-modulated carrier mode. The transmission of the non-modulated carrier wave from this reading/writing apparatus 111 to the non-contact IC card 112 is carried out by that magnetic fluxes produced from the loop antenna 5 magnetically intersect the antenna coil 12 of the non-contact IC card 112 so as to energize an induced voltage due to an electromagnetic coupling effect. On the side of the non-contact IC card 112, the induced voltage of the antenna coil 12 is rectified by a rectifying circuit (not shown) employed in the IC chip 13, and thus, the rectified voltage is employed as a power supply with respect to the respective circuits employed in the non-contact IC card 112. Also, the same induced voltage is conducted to a demodulating circuit (not shown) so as to demodulate data supplied from the reading/writing apparatus 111.

Next, when data is transferred from the non-contact IC card 112 to the reading/writing apparatus 111, the reading/writing apparatus 111 transmits non-modulated carrier waves so as to supply only electric power to the non-contact. IC card 112. On the side of this non-contact IC card 112, in response to a "1" bit and a "0" bit of data "DATAb" read out from a memory (not shown) provided in the IC chip 13, a switch is turned ON/OFF in a modulating circuit (not shown) which is constituted by this switch and a load resistor (not shown), which are connected to, for example, the antenna coil 12. As explained above, when the switch is turned ON/OFF, a load with respect to the antenna coil 12 is varied. This load variation is transferred to the loop antenna 5 provided on the side of the reading/writing apparatus 111 due to electromagnetic induction effects, and thus, an impedance on the side of the loop antenna 5 is varied. As a consequence, a high frequency signal flowing from the loop antenna 5 to a wireless receiving circuit 2, namely, a high frequency signal (incident electromagnetic wave) which is transmitted from a wireless transmitting unit 1 is reached via the primary line path formed between the terminals "a" to "b" of the directional coupler 4 to the loop antenna 5. Then, this reached high frequency signal is reflected from the loop antenna 5 as reflection waves in response to a change of antenna impedance values in a desirable frequency band, and is again entered into the directional coupler 4 as such a high frequency signal (reflection wave), the wave propagation direction of which is opposite to that of the above-described high frequency signal. Then, this entered high frequency signal is outputted from one terminal "c" of a secondary line path formed between the terminal "b" and another terminal "c" of the directional coupler 4, and then is conducted to the wireless receiving unit 2. As a result, the input signal to the wireless receiving unit 2 may become only such a high frequency signal (reflection wave) in response to the change contained in the antenna impedance values in the desirable frequency band as explained above. Therefore, such an ideal circuit arrangement maybe established which owns the better reception characteristic.

(Embodiment 2)

FIG. 2 is a block diagram for showing a non-contact IC card reading/writing apparatus according to an embodiment 2 of the present invention. FIG. 2(a) is a block diagram for indicating the non-contact IC card reading/writing apparatus according to the embodiment 2 of the present invention, and FIG. 2(b) is a detailed circuit diagram as to a portion of the non-contact IC card reading/writing apparatus of FIG. 2(a). That is, FIG. 2(b) is the detailed circuit diagram in such a case that a series-resonant circuit is employed as one example of a resonant circuit. FIG. 2(a) is a block diagram for indicating a circuit portion related to such a coupling operation that a reading/writing apparatus 111 is coupled to a non-contact IC card 112 in a non-contact IC card system. In FIG. 2, in the case that transmission data is transferred, a carrier wave produced from an oscillator 6 is entered to a modulator 7, and the modulator 7 modulates this entered carrier wave by data "DATAa." Then, the modulated carrier wave is amplified by a power amplifier 8, and the amplified carrier wave is transmitted from a loop antenna 5 via a primary line path formed between a terminal "a" and another terminal "b" of a circulator 14 shown in FIG. 2. Also, in the case that only electric power is transferred, the carrier wave produced from the oscillator 6 is transmitted in a non-modulated carrier mode. The transmission of the non-modulated carrier wave from this reading/writing apparatus 111 to the non-contact IC card 112 is carried out by that magnetic fluxes produced from the loop antenna 5 magnetically intersect the antenna coil 12 of the non-contact IC card 112 so as to energize an induced voltage due to an electromagnetic coupling effect. In the non-contact IC card 112, the induced voltage of the antenna coil 12 is rectified by a rectifying circuit (not shown) employed in the IC chip 13, and thus, the rectified voltage is employed as a power supply with respect to the respective circuits employed in the non-contact IC card 112. Also, the same induced voltage is conducted to a demodulating circuit (not shown) so as to demodulate data supplied from the reading/writing apparatus 111.

Next, when data is transferred from the non-contact IC card 112 to the reading/writing apparatus 111, the reading/writing apparatus 111 transmits non-modulated carrier waves so as to supply only electric power to the non-contact IC card 112. On the side of this non-contact IC card 112, in response to a "1" bit and a "0" bit of data "DATAb" read out from a memory (not shown) provided in the IC chip 13, a switch is turned ON/OFF in a modulating circuit (not shown) which is constituted by this switch and a load resistor (not shown), which are connected to, for example, the antenna coil 12. As explained above, when the switch is turned ON/OFF, a load with respect to the antenna coil 12 is varied. This load variation is transferred to the loop antenna 5 provided on the side of the reading/writing apparatus 111 due to electromagnetic induction effects, and thus, an impedance on the side of the loop antenna 5 is varied. As a consequence, a high frequency signal flowing from the loop antenna 5 to a wireless receiving circuit 2, namely, a high frequency signal (incident electromagnetic wave) which is transmitted from a wireless transmitting unit 1 is reached via the primary line path formed between the terminals "a" to "b" of the circulator 14 to the loop antenna 5. Then, this reached high frequency signal is reflected from the loop antenna 5 as reflection waves in response to a change of antenna impedance values in a desirable frequency band, and is again entered into the circulator 14 as such a high frequency signal (reflection wave), the wave propagation direction of which is opposite to that of the above-described high frequency signal. Then, this entered high frequency signal is outputted from one terminal "c" of a secondary line path formed between the terminal "b" and another terminal "c" of the circulator 14, and then is conducted to the wireless receiving unit 2. As a result, the input signal to the wireless receiving unit 2 may become only such a high frequency signal (reflection wave) in response to the change contained in the antenna impedance values in the desirable frequency band as explained above. Therefore, such an ideal circuit arrangement may be established which owns the better reception characteristic.

(Embodiment 3)

FIG. 3 is a block diagram for showing a non-contact IC card reading/writing apparatus according to an embodiment 3 of the present invention. FIG. 3(a) is a block diagram for indicating the non-contact IC card reading/writing apparatus according to the embodiment 3 of the present invention, and FIG. 3(b) is a detailed circuit diagram as to a portion of the non-contact IC card reading/writing apparatus of FIG. 3(a). That is, FIG. 3(b) is the detailed circuit diagram in such a case that a series-resonant circuit is employed as one example of a resonant circuit. FIG. 3(a) is a block diagram for indicating a circuit portion related to such a coupling operation that a reading/writing apparatus 111 is coupled to a non-contact IC card 112 in a non-contact IC card system. In FIG. 3, in the case that transmission data is transferred, a carrier wave produced from an oscillator 6 is entered to a modulator 7, and the modulator 7 modulates this entered carrier wave by data "DATAa." Then, the modulated carrier wave is amplified by a power amplifier 8, and the amplified carrier wave is transmitted via a matching circuit 9 and also via a first isolator 15 shown in FIG. 3 from the loop antenna 5. Also, in the case that only electric power is transferred, the carrier wave produced from the oscillator 6 is transmitted in a non-modulated carrier mode. The transmission of the non-modulated carrier wave from this reading/writing apparatus 111 to the non-contact IC card 112 is carried out by that magnetic fluxes produced from the loop antenna 5 magnetically intersect the antenna coil 12 of then on-contact IC card 112 so as to energize an induced voltage due to an electromagnetic coupling effect. On the side of the non-contact IC card 112, the induced voltage of the antenna coil 12 is rectified by a rectifying circuit (not shown) employed in the IC chip 13, and thus, the rectified voltage is employed as a power supply with respect to the respective circuits employed in the non-contact IC card 112. Also, the same induced voltage is conducted to a demodulating circuit (not shown) so as to demodulate data supplied from the reading/writing apparatus 111.

Next, when data is transferred from the non-contact IC card 112 to the reading/writing apparatus 111, the reading/writing apparatus 111 transmits non-modulated carrier waves so as to supply only electric power to the non-contact IC card 112. On the side of this non-contact IC card 112, in response to a "1" bit and a "0" bit of data "DATAb" read out from a memory (not shown) provided in the IC chip 13, a switch is turned ON/OFF in a modulating circuit (not shown) which is constituted by this switch and a load resistor (not shown), which are connected to, for example, the antenna coil 12. As explained above, when the switch is turned ON/OFF, a load with respect to the antenna coil 12 is varied. This load variation is transferred to the loop antenna 5 provided on the side of the reading/writing apparatus 111 due to electromagnetic induction effects, and thus, an impedance on the side of the loop antenna 5 is varied. As a consequence, a high frequency signal flowing from the loop antenna 5 to a wireless receiving circuit 2, namely, a high frequency signal (incident electromagnetic wave) which is transmitted from a wireless transmitting unit 1 is reached via a signal path formed between the terminals "a" to "b" of the first isolator 15 to the loop antenna 5. Then, this reached high frequency signal is reflected from the loop antenna 5 as reflection waves in response to a change of antenna impedance values in a desirable frequency band, and is again entered into one terminal "c" of a second isolator 16 as such a high frequency signal (reflection wave), the wave propagation direction of which is opposite to that of the above-described high frequency signal. Then, this entered high frequency signal is outputted from another terminal "d" of the second isolator 16, and then is conducted to the wireless receiving unit 2. As a result, the input signal to the wireless receiving unit 2 may become only such a high frequency signal (reflection wave) in response to the change contained in the antenna impedance values in the desirable frequency band as explained above. Therefore, such an ideal circuit arrangement may be established which owns the better reception characteristic.

While the embodiments 1 to 3 of the present invention have been described, as previously explained, the carrier wave produced from the oscillator is amplified by the power amplifier. It is preferable to employ an E-class amplifier in order to amplify the carrier wave. Since the E-class amplifier is employed, the high efficiency operation can be realized. As a consequence, even when the transmission power is increased, the heat generation can be suppressed.

First, referring now to FIG. 9, a description is made of a modulating system with employment of a subcarrier. FIG. 9 is a graph for graphically representing a relationship between a frequency and a signal strength. As shown in FIG. 9, in a non-contact IC card system, the modulating system using the subcarrier is utilized in a load modulation which is employed so as to transfer data from the non-contact IC card to a reading/writing apparatus in such a system mainly operated in a frequency range of 13.56 MHz. FIG. 15 is a diagram for indicating a 13.56 MHz system comparison table. In the system operated in the frequency range of 13.56 MHz, as shown in FIG. 9, the subcarrier frequency of 847 KHz (13.56 MHz/16), 423 KHz (13.56 MHz/32), or 212 KHz (13.56 MHz/64) is normally used. As shown in FIG. 3, when the load modulation is carried out by the subcarrier, two sets of spectra are produced at ± subcarrier frequencies "fH" in the vicinity of the carrier wave frequency. In such a non-contact IC card system whose coupling degree is weak, a difference between the carrier wave signal of the reading/writing apparatus and the reception modulated side band which has been load-modulated is varied within a range between approximately 80 to 90 dB. Since the information is contained in any side band of the two subcarrier modulations, either a lower-sided subcarrier may be used or an upper-sided subcarrier may be utilized.

(Embodiment 4)

FIG. 7 is a block diagram for showing a non-contact IC card reading/writing apparatus according to an embodiment 4 of the present invention. FIG. 7(a) is a block diagram for indicating the non-contact IC card reading/writing apparatus according to the embodiment 4 of the present invention, and FIG. 7(b) is a detailed circuit diagram as to a portion of the non-contact IC card reading/writing apparatus of FIG. 7(a). That is, FIG. 7(b) is the detailed circuit diagram in such a case that a series-resonant circuit is employed as one example of a resonant circuit. In FIG. 7, in the case that transmission data is transferred, a carrier wave produced from an oscillator 207 is entered to a modulator 208, and the modulator 208 modulates this entered carrier wave by transmission data. Then, the modulated carrier wave is amplified by a power amplifier 209, and the amplified carrier wave is transmitted via a matching circuit 210 and also via a first resonant circuit 204 constructed of C1, C2, L1 shown in FIG. 7 from a loop antenna 203. Also, in the case that only electric power is transferred, the carrier wave produced from the oscillator 207 is transmitted in a non-modulated carrier mode. The transmission of the non-modulated carrier wave from this reading/writing apparatus 311 to the non-contact IC card 312 is carried out by that magnetic fluxes produced from the loop antenna 203 magnetically intersect an antenna coil 212 of the non-contact IC card 312 so as to energize an induced voltage due to an electromagnetic coupling effect. In the non-contact IC card 312, the induced voltage of the antenna coil 212 is rectified by a rectifying circuit (not shown) employed in the IC chip 213, and thus, the rectified voltage is employed as a power supply with respect to the respective circuits employed in the non-contact IC card 312. Also, the same induced voltage is conducted to a demodulating circuit (not shown) so as to demodulate data supplied from the reading/writing apparatus 311.

Next, when data is transferred from the non-contact IC card 312 to the reading/writing apparatus 311, the reading/writing apparatus 311 transmits non-modulated carrier waves so as to supply only electric power to the non-contact IC card 312. On the side of this non-contact IC card 312, in response to a "1" bit and a "0" bit of data "DATAb" read out from a memory (not shown) provided in the IC chip 213, a switch is turned ON/OFF in a modulating circuit (not shown) which is constituted by this switch and a load resistor (not shown), which are connected to, for example, the antenna coil 212. As explained above, when the switch is turned ON/OFF, a load with respect to the antenna coil 212 is varied. This load variation is transferred to the loop antenna 203 provided on the side of the reading/writing apparatus 311 due to electromagnetic induction effects, and thus, an impedance on the side of the loop antenna 203 is varied. The data is demodulated by a demodulator 211 of a wireless receiving unit 202 via a coupling capacitor C3 connected to the loop antenna 203, and also, via a second resonant circuit constituted by C4 and L3. Since the resonant circuit exclusively used for the transmission frequency and the resonant circuit exclusively used for the reception frequency are provided in the non-contact IC card reading/writing apparatus 311 with employment of the above-described arrangement, the transmission/reception characteristics thereof can be improved.

(Embodiment 5)

Figure 11:
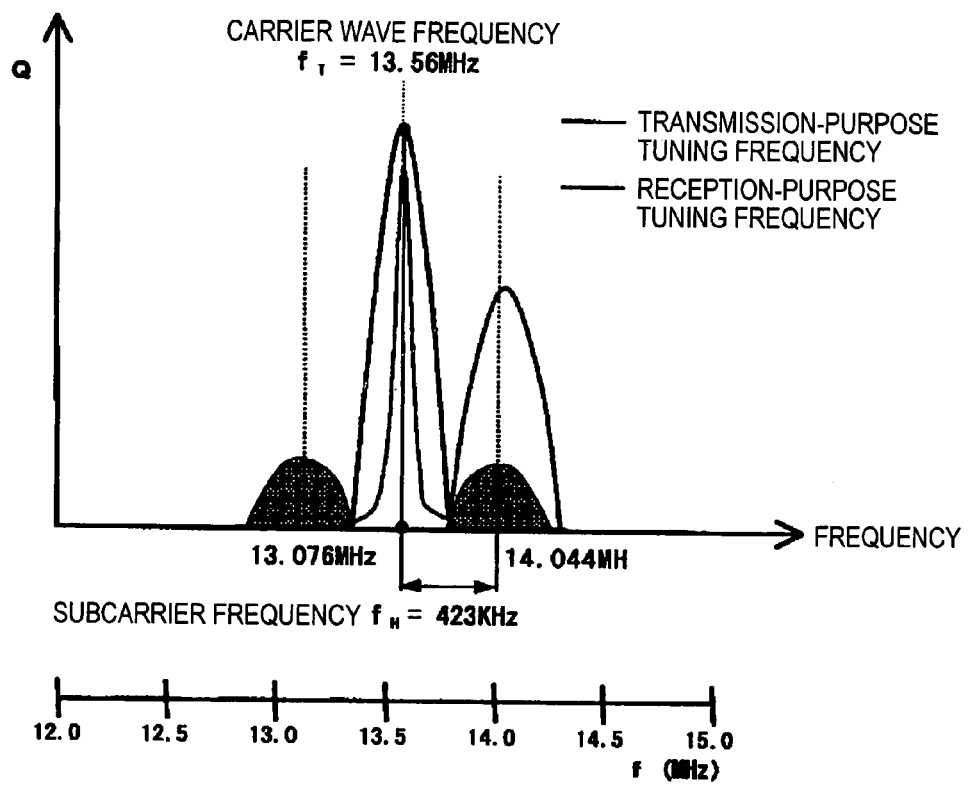
FIG. 11 is a graph for graphically indicating a relationship between a frequency of a tuning circuit and a Q-factor.

In FIG. 7(b), while the values of C1, C2, and L1 employed in the first resonant circuit unit 204 are set to be equal to a frequency of a carrier wave used to transfer both electric power and a transmission signal, the values of C4 and L3 employed in the second resonant circuit unit are set to be equal to a frequency of a modulated subcarrier which is produced by a load variation occurred on the side of the non-contact IC card 312. As a result, as shown in FIG. 11, when the electric power and the transmission signal are transmitted from the reading/writing apparatus 111, since the resonant frequency of the first resonant circuit unit is set to such a frequency which is specified to the frequency of the carrier wave used to transfer both the electric power and the transmission signal, the Q-factor can be maximized, and thus, both the electric power and the transmission signal can be transferred in a higher efficiency. As a result, a power transfer efficiency can be improved. It should be understood that FIG. 11 is a graph for graphically showing a relationship between a frequency of a tuning circuit and a Q-factor.

Furthermore, when the data is received from the non-contact IC card 111, since the resonant frequency of the second resonant circuit unit is set to such a frequency which is specified to a reception modulation side band which has been modulated by the load variation, the Q-factor can be maximized, and detouring of the carrier waves to the reception side can be largely reduced. As a result, since the reception signal can be received in a higher efficiency, a reception efficiency can be improved.

(Embodiment 6)

In FIG. 7(b), the non-contact IC card reading/writing apparatus is arranged as follows: That is, while a second coil "L4" is positioned in the vicinity of the first coil "L3" which constitutes the second resonant circuit unit 205 and is coupled to this first coil "L3" by way of mutual induction effects, one terminal of the first coil "L3" is connected to a first ground "G1", one terminal of the second coil "L4" is connected to a second ground "G2", and the first ground "G1" of both a wireless transmitting unit and an antenna interface unit is separated from the second ground "G2" of a wireless receiving unit. As a result, it is possible to avoid such an operation that the second ground "G2" on the reception side is swung by a carrier signal having a large amplitude transmitted from the wireless transmitting unit, and the reception performance can be largely improved.

(Embodiment 7)

In FIG. 7(b), both a turn number "n1" of the first coil "L3" which constitutes the second resonant circuit unit 205 and a turn number "n2" of the second coil "L4" which is coupled to the first coil "L3" by way of mutual induction is matched to an output impedance "Z1" of the second resonant circuit unit 205, and the turn number "n2" is matched to an input impedance "Z2" of the above-described wireless receiving unit. As a result, since the first coil "L3" and the second coil "L4" own impedance converting functions, mismatching loss can be reduced, the reception performance can be improved, and no longer such an impedance converting circuit is separately employed. As a consequence, there are such effects that the circuit scale can be made compact, and the cost down effect can be achieved.

(Embodiment 8)

Figures 8A, 8B:
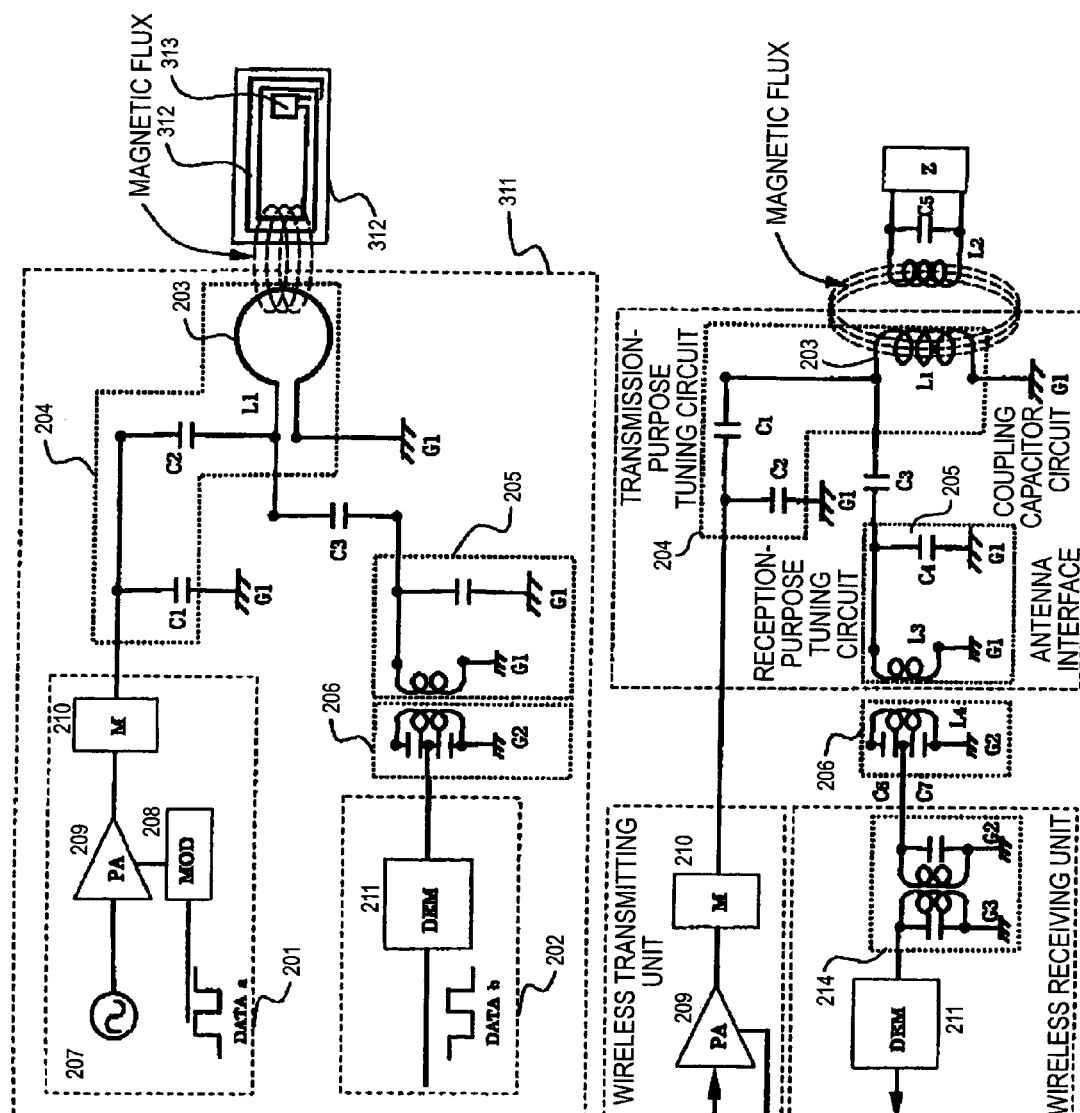
FIG. 8 is a block diagram of a non-contact IC card reading/writing apparatus according to another embodiment of the present invention.

FIG. 8 is a block diagram for showing a non-contact IC card reading/writing apparatus according to an embodiment 205 of the present invention. FIG. 8(a) is a block diagram for indicating the non-contact IC card reading/writing apparatus according to the embodiment 5 of the present invention, and FIG. 8(b) is a detailed circuit diagram as to a portion of the non-contact IC card reading/writing apparatus of FIG. 8(a). That is, FIG. 8(b) is the detailed circuit diagram in such a case that a series-resonant circuit is employed as one example of the first resonant circuit. As indicated in FIG. 8, the IC card reading/writing apparatus is arranged as follows: That is, while both a first capacitor C6 and a second capacitor C7 are series-connected between one terminal and the other terminal of the second coil "L4" which constitutes the second resonant circuit unit, an output signal is derived from a junction point between the first capacitor C6 and the second capacitor C7, and is connected in order to be matched to the input impedance of the above-described wireless receiving unit. As a consequence, a second resonance circuit function is combined with an impedance converting function with respect to the above-described wireless receiving unit. Also, the circuit scale can be made compact and the reception efficiency can be improved.

(Embodiment 9)

Figure 6:
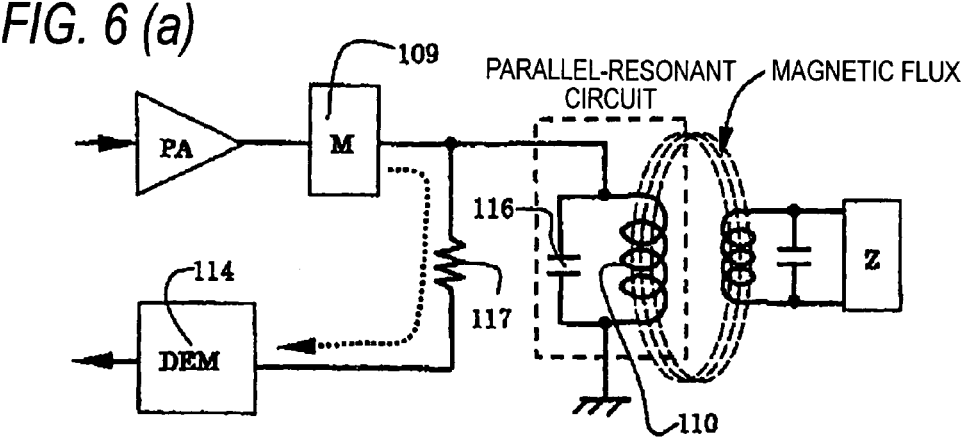
FIG. 6 is a block diagram of the conventional non-contact IC card reading/writing apparatus.
Figure 6:
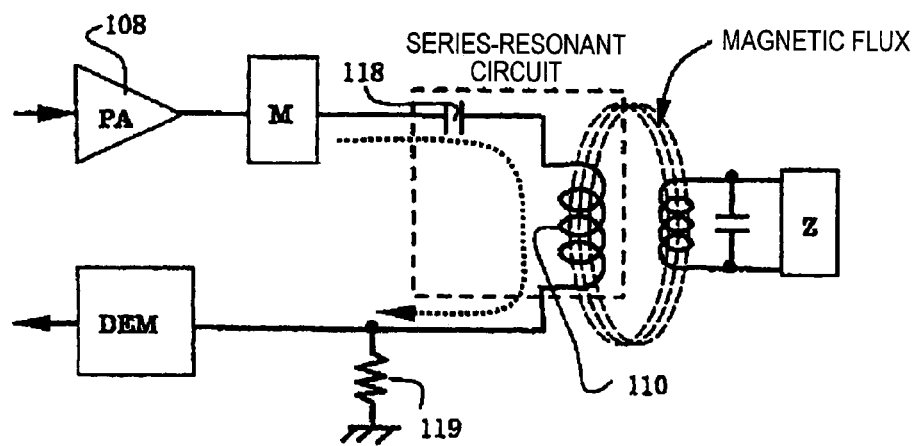
Figure 6:
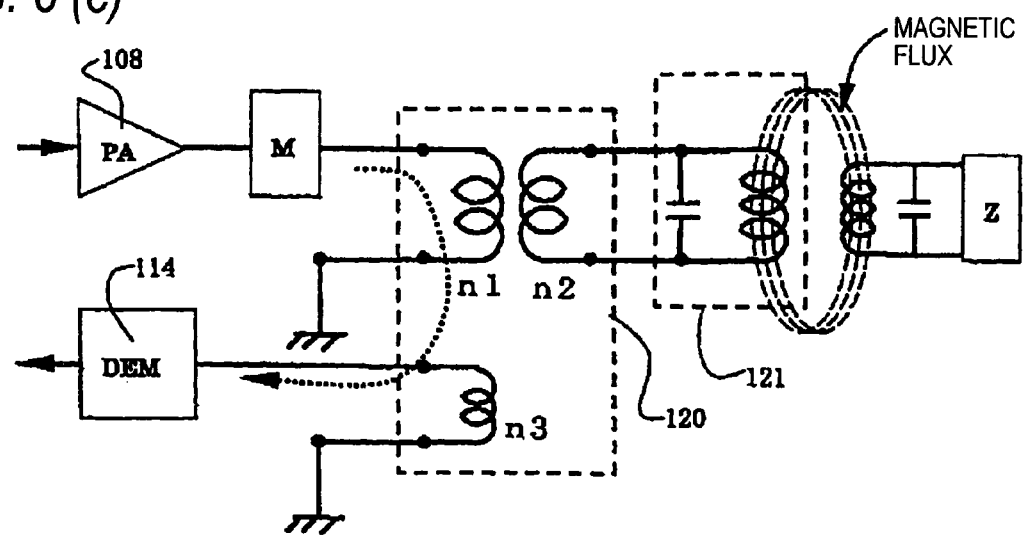
Figure 12:
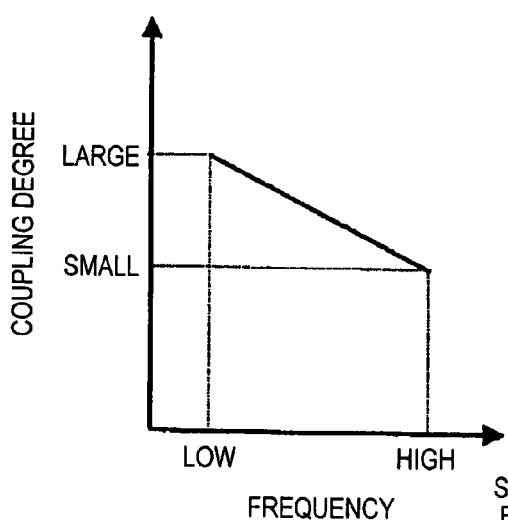
FIG. 12 is a graph for graphically representing a frequency-to-coupling degree and a reception signal strength.
Figure 12:
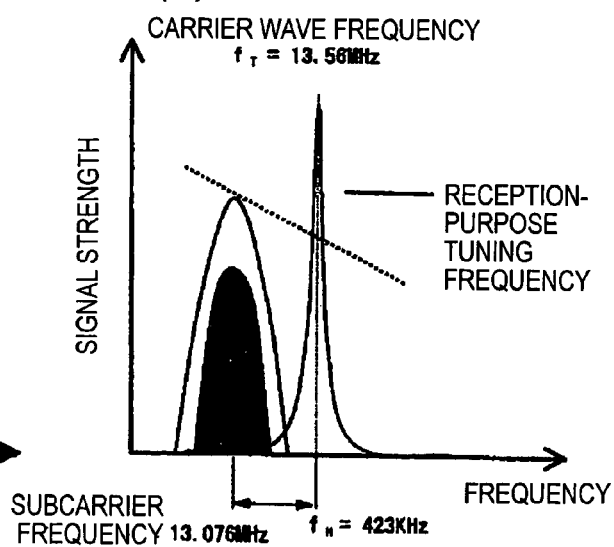

In FIG. 7(b), the non-contact IC reading/writing apparatus of an embodiment 6 is arranged as follows. That is, in the circuit arrangement constituted by the first coil "L3" which constructs the second resonant circuit unit 205 and the second coil "L4" which is mutually coupled to the first coil "L3" by way of mutual induction effects, the resonant frequency of the second resonant circuit unit 205 is set to a frequency of a lower-sided modulated subcarrier within both side bands formed by a load variation on the side of the non-contact IC card as shown in FIG. 12(b). On the reception side, the carrier wave corresponds to an unwanted wave (U) whereas the modulated subcarrier corresponds to a wanted wave (D). Therefore, in order to increase a D/U ratio, apparently, the wanted wave (D) must be increased and the unwanted wave (U) must be decreased. Since the first coil L3 is coupled to the second coil L4 by way of the mutual induction effects, as represented in FIG. 6(a), the higher the frequency becomes, the coupling degree between the first coil L3 and the second coil L4 is decreased, whereas the lower the frequency becomes, the coupling degree between the first coil L3 and the second coil L4 is increased. As a result, the coupling degree as to the unwanted wave (U) whose frequency is high becomes larger than the coupling degree as to the wanted wave (D) whose frequency is low. As a consequence, the D/U ratio can be improved and the reception performance can be improved. It should be noted that FIG. 12 is a graph for graphically representing both a frequency-to-coupling degree, and a reception signal strength-to-frequency.

(Embodiment 10)

Figure 13:
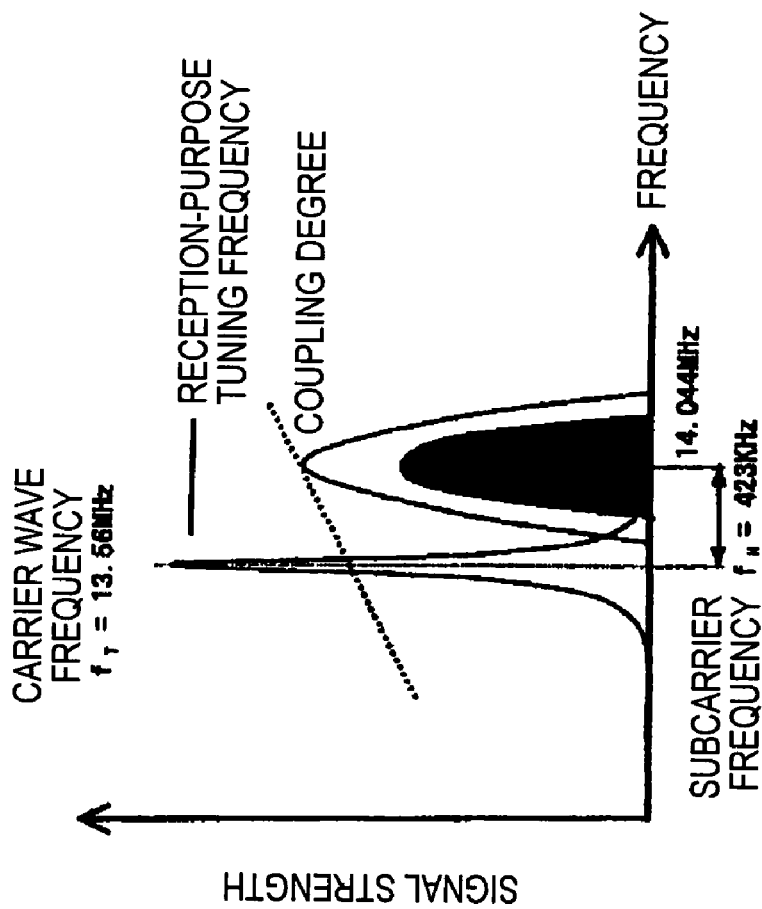
FIG. 13 is a graph for graphically representing a frequency-to-coupling degree and a reception signal strength.
Figure 13:
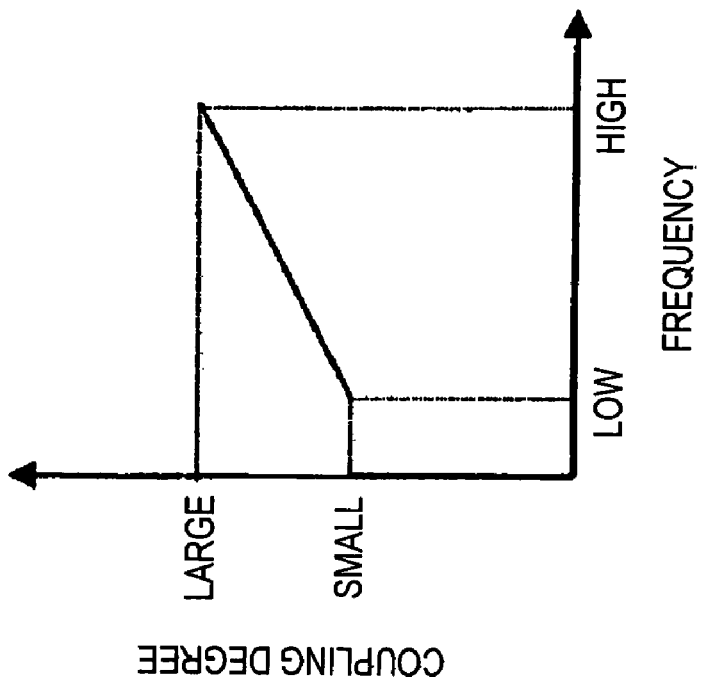

In FIG. 8(b), the non-contact IC reading/writing apparatus of an embodiment 10 is arranged as follows. That is, in the circuit arrangement constituted by the first coil "L3" which constructs the second resonant circuit unit 205 and the second coil "L4" which is mutually coupled to the first coil "L3" by way of mutual induction effects, both a first capacitor C6 and a second capacitor C7 are series-connected between one terminal and the other terminal of the second coil "L4", and an output signal is derived from an intermediate point between the first capacitor C6 and the second C7. In this circuit arrangement, the resonant frequency of the second resonant circuit unit 205 is set to a frequency of an upper-sided modulated subcarrier within both side bands formed by a load variation on the side of the non-contact IC card as shown in FIG. 13(b). On the reception side, the carrier wave corresponds to an unwanted wave (U) whereas the modulated subcarrier corresponds to a wanted wave (D). Therefore, in order to increase a D/U ratio, apparently, the wanted wave (D) must be increased and the unwanted wave (U) must be decreased. Since the first resonant circuit which is resonated at the frequency of the carrier wave is coupled to the second resonant circuit which is resonated at the frequency of the upper-sided modulated subcarrier by employing a coupling capacitor C3, as indicated in FIG. 13(a), the coupling degree is large at the high frequency, whereas the coupling degree is small at the low frequency. As a result, the coupling degree as to the unwanted wave (U) whose frequency is high becomes larger than the coupling degree as to the wanted wave (D) whose frequency is low. As a consequence, the D/U ratio can be improved and the reception performance can be improved. Further, since the loop coil 203 is impedance-matched with the wireless receiving unit, the impedance converting operation is not carried out at the secondary winding by the induction coupling, but since the tap down circuit by the capacitor of the resonant circuit is employed, the impedance can be converted while this D/U ratio is maintained. The circuit scale can be made compact. It should be understood that FIG. 13 is a graph for graphically representing both a frequency-to-coupling degree, and a reception signal strength-to-frequency.

(Embodiment 11)

Figure 14:
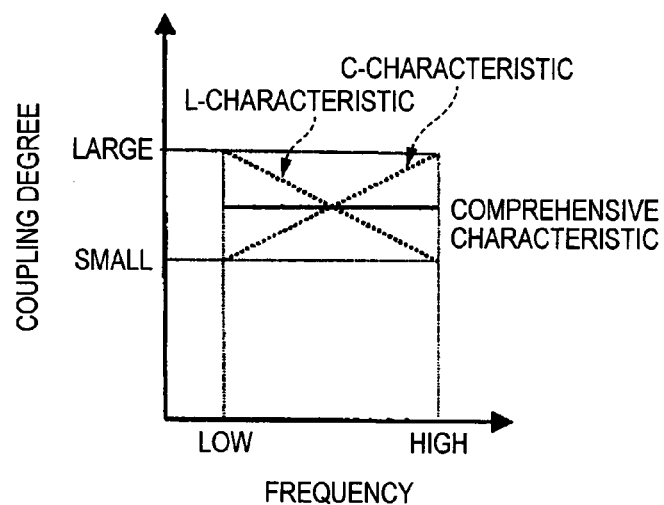
FIG. 14 is a graph for graphically representing a frequency-to-coupling degree and a reception signal strength.
Figure 14:
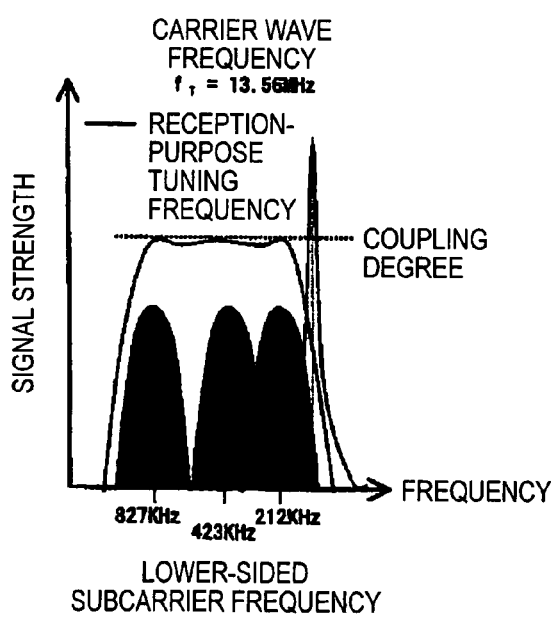
Figure 14:
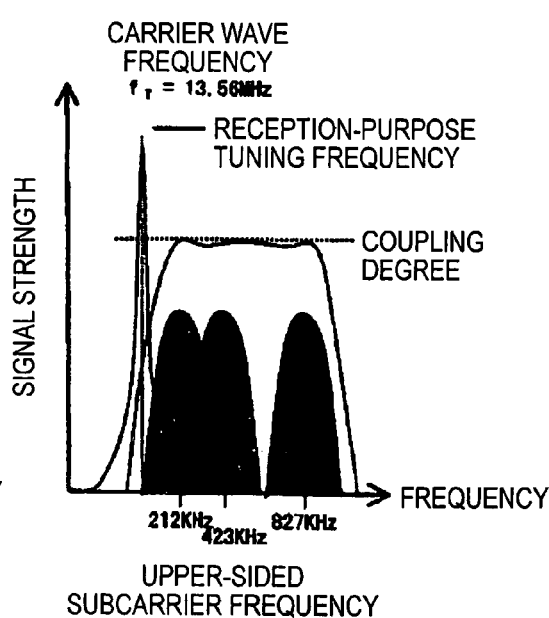

In FIG. 8(b), a first resonant circuit which is resonated at a frequency of a carrier wave is coupled to a second resonant circuit which is resonated at a frequency of a subcarrier by a coupling capacitor C3 so as to constitute a sub-tuning circuit. First, as indicated in FIG. 14(a), due to the characteristic of the coupling capacitor C3, the coupling degree is large at the high frequency, whereas the coupling degree is small at the low frequency. Conversely, as to the characteristic of the second coil L4, since the second coil L4 is magnetically coupled to the first coil L3 which constitutes the second resonant circuit unit by way of the mutual induction effects, the coupling degree is small when the frequency is high, whereas the coupling degree is large when the frequency is low. Therefore, in the case that the two circuits having these counter-sensed characteristics are combined with each other, the respective characteristics are canceled to each other, so that a broadband resonant circuit having a flat frequency characteristic can be obtained. As a result, as indicated in FIG. 14(b), irrespective of the frequency, even in the systems where the frequencies of the modulated subcarriers are different from each other, namely, 212 KHz, 484 KHz, and 847 KHz, the D/U ratio can be made constant by single hardware. The stable reception characteristic can be achieved, and also, the circuit scale can be made compact. It should also be understood that FIG. 14 is a graph for graphically representing both a frequency-to-coupling degree, and a reception signal strength-to-frequency.

(Embodiment 12)

In FIG. 8(b), a non-contact IC card reading/writing apparatus of an embodiment 9 is arranged as follows. That is, while an intermediate frequency transformer 214 is provided between the second resonant circuit unit 205 and the wireless receiving unit, one terminal of a first coil "L5" of the intermediate transformer 214 is connected the ground "G2" of the second resonant circuit unit 205, one terminal of a second coil "L6" of the intermediate transformer 214 is connected to the ground "G3" of the wireless receiving unit, and the ground "G2" of the second resonant circuit unit 205 is separated from the ground "G3" of the wireless receiving unit, and further, the carrier wave and the reception signal wave are separated from each other in a frequency manner by the intermediate frequency transformer 14. As a result, it is possible to avoid such an operation that the ground of the wireless receiving unit 205 is swung by the carrier wave having the large amplitude supplied from the second resonant circuit unit 205. Furthermore, such an operation that the frequency component of the carrier wave is entered into the wireless receiving unit 205 can be largely suppressed, and thus, the reception performance can be improved.

As previously explained, in accordance with the present invention, since the wireless transmitting unit is isolated from the wireless receiving unit, such an operation that the high frequency signal having the large amplitude is entered from the wireless transmitting unit into the demodulating circuit employed in the wireless receiving unit can be largely reduced, and such a filter circuit having the high-performance band blocking characteristic is no longer required. This filter circuit has been conventionally required so as to filter this high frequency having the large amplitude, and has been provided at the prestage of the demodulating circuit. Furthermore, lowering of the power efficiency which is caused by inserting the filter circuit can be avoided. In addition, since the circuit arrangement between the wireless receiving unit and the resonant circuit portion constructed of the loop antenna and the capacitor may be provided with the directivity, as the input signal entered into the wireless receiving unit, only the high frequency (reflection electromagnetic wave) in response to the antenna impedance in the desirable frequency band is entered, which may constitute the ideal circuit arrangement. As a consequence, the non-contact IC card reading/writing apparatus having the better reception characteristic can be provided.

While the embodiments 4 to 12 of the present invention have been described, as previously explained, the carrier wave produced from the oscillator is amplified by the power amplifier. It is preferable to employ an E-class amplifier in order to amplify the carrier wave. Since the E-class amplifier is employed, the high efficiency operation can be realized. As a consequence, even when the transmission power is increased, the heat generation can be suppressed.

As previously explained, in accordance with the present invention, the resonant frequency of the first resonant circuit unit is set to the frequency of the carrier wave used to transfer both the electric power and the transmission signal, and the resonant frequency of the second resonant circuit unit is set to the frequency of the modulated subcarrier which is formed by the load variation occurred on the side of the non-contact IC card. As a consequence, when the electric power and the transmission signal are transmitted from the reading/writing apparatus, since the resonant frequency of the first resonant circuit unit is set to such a frequency which is specified to the frequency of the carrier wave used to transfer both the electric power and the transmission signal, the Q-factor can be minimized and the power transfer efficiency can be improved.

Furthermore, when the data is received from the non-contact IC card, since the resonant frequency of the second resonant circuit unit is set to such a frequency which is specified to the frequency of the received modulation side band which has been modulated by the load, the Q-factor can be maximized. Also, detouring of the carrier wave to the reception side can be largely reduced, and thus, the reception efficiency can be improved. As previously explained, in accordance with the present invention, the non-contact IC card reading/writing apparatus having the superior transmission/reception characteristic can be provided.

CROSS REFERENCE TO RELATED APPLICATION

This application is based upon and claims the benefit of priority of Japanese Patent Application No. P2002-372222 filed on Dec. 24, 2002 and Japanese Patent Application No. P2002-374383 filed on Dec. 25, 2002, the contents of which are incorporated herein by reference in its entirety.

What is claimed is:

1. A non-contact IC card reading/writing apparatus, comprising:
a loop antenna, which supplies both electric power and a transmission signal to a non-contact IC card by way of an electromagnetic induction effect and acquires a reception signal from the non-contact IC card by way of a load variation;
a first resonant circuit, which resonates the loop antenna at a first frequency;
a wireless transmitter, which supplies both electric power and transmission data via the first resonant circuit to the loop antenna; and
a wireless receiver, which acquires a reception signal from the loon antenna via a second resonant circuit which is connected to the loop antenna by way of coupling capacitor and is resonated at a second frequency, wherein:
data transmitted from the non-contact IC card is demodulated from the reception signal by a demodulating circuit;
both a turn number "n1" of the first coil which constitutes the second resonant circuit and a turn number "n2" of the second coil which is coupled to the first coil by way of the mutual induction effect are selected in such a manner that said turn number "n1" is matched to an output impedance "z1" of the second resonant circuit, and the turn number "n2" is matched to an input impedance of the wireless receiver; and
both the first coil and the second coil own an impedance converting function.

2. A non-contact IC card reading/writing apparatus, comprising:
a loop antenna, which supplies both electric power and a transmission signal to a non-contact IC card by way of an electromagnetic induction effect and acquires a reception signal from the non-contact IC card by way of a load variation;
a first resonant circuit, which resonates the loop antenna at a first frequency;
a wireless transmitter, which supplies both electric power and transmission data via the first resonant circuit to the loop antenna; and
a wireless receiver, which acquires a reception signal from the loop antenna via a second resonant circuit which is connected to the loop antenna by way of coupling capacitor and is resonated at a second frequency, wherein:
data transmitted from the non-contact IC card is demodulated from the reception signal by a demodulating circuit;
both a first capacitor "C1" and a second capacitor "C2" series-connected between one terminal and the other terminal of the second coil;
an output signal is derived from a joint point between the first capacitor C1 and the second capacitor C2; and
both the first capacitor C1 and the second capacitor C2 own an impedance converting function.

3. A non-contact IC card reading/writing apparatus, comprising:
a loop antenna, which supplies both electric power and a transmission signal to a non-contact IC card by way of an electromagnetic induction effect and acquires a reception signal from the non-contact IC card by way of a load variation;
a first resonant circuit, which resonates the loop antenna at a first frequency;
a wireless transmitter, which supplies both electric power and transmission data via the first resonant circuit to the loop antenna; and
a wireless receiver, which acquires a reception signal from the loop antenna via a second resonant circuit which is connected to the loop antenna by way of coupling capacitor and is resonated at a second frequency, wherein:
data transmitted from the non-contact IC card is demodulated from the reception signal by a demodulating circuit;
an intermediate frequency transformer is provided between the second resonant circuit and the wireless receiver; and
the ground of the second resonant circuit is separated from the ground of the wireless receiver.

4. A non-contact IC card reading/writing apparatus comprising:
a loop antenna, which supplies both electric power and a transmission signal to a non-contact IC card by way of an electromagnetic induction effect and acquires a reception signal from the non-contact IC card by way of a load variation;
a resonant circuit, which resonates the loop antenna at a desirable frequency;
a wireless transmitter, which supplies both electric power and transmission data via the resonant circuit to the loop antenna; and
a wireless receiver, which acquires a reception signal from the loop antenna via the resonant circuit, wherein:
data transmitted from the non-contact IC card is demodulated from the reception signal by a demodulating circuit;
the resonant circuit and the wireless receiver are coupled to each other via a first isolator in which the reception signal is transmitted from the antenna to the receiver; and
the resonant circuit and the wireless transmitter are coupled to each other via a second isolator in which the transmission signal is transmitted from the transmitter to the antenna.

* * * * *